(12) United States Patent
Mardilovich et al.

(10) Patent No.: US 7,029,777 B2
(45) Date of Patent: Apr. 18, 2006

(54) FUEL CELL AND PASSIVE SUPPORT

(75) Inventors: Peter Mardilovich, Corvallis, OR (US);
Gregory S Herman, Albany, OR (US);
Christopher Beatty, Albany, OR (US);
James O'Neil, Corvallis, OR (US);
David Champion, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 10/412,034

(22) Filed: Apr. 10, 2003

(65) Prior Publication Data

US 2004/0202919 A1    Oct. 14, 2004

(51) Int. Cl.
*H10M 8/12*    (2006.01)
*H01M 4/86*    (2006.01)
*H01M 4/88*    (2006.01)
*B05D 5/12*    (2006.01)

(52) U.S. Cl. .............. 429/13; 429/30; 429/40; 429/44; 429/45; 502/101; 427/115; 264/618

(58) Field of Classification Search ........... 429/13, 429/30, 32, 33, 40, 41, 44, 45; 502/101; 264/618; 427/115
See application file for complete search history.

(56) References Cited

U.S. PATENT DOCUMENTS

| 3,132,972 | A | * | 5/1964 | Ludwig | 429/41 X |
| 3,160,527 | A | * | 12/1964 | Hess | 429/41 |
| 3,226,263 | A | * | 12/1965 | Oswin | 419/2 |
| 5,114,803 | A | | 5/1992 | Ishihara et al. | |
| 6,183,609 | B1 | * | 2/2001 | Kawasaki et al. | 429/45 X |
| 6,228,521 | B1 | | 5/2001 | Kim et al. | |
| 6,420,062 | B1 | * | 7/2002 | Prohaska et al. | 429/40 |
| 6,811,912 | B1 | * | 11/2004 | Kurtz | 429/30 |

* cited by examiner

*Primary Examiner*—Stephen J. Kalafut

(57) ABSTRACT

A fuel cell is disclosed that includes a passive support having a fine pore region disposed between a first coarser pore region and a second coarser pore region. An exemplary fuel cell has an electrolyte material positioned in the fine pore region and a first electrode material positioned in the first coarser pore region and a second electrode material positioned in the second coarser pore region. Other exemplary devices and/or methods are also disclosed.

37 Claims, 19 Drawing Sheets

EXEMPLARY FUEL CELL

EXEMPLARY METHOD

EXEMPLARY FUEL CELL

EXEMPLARY FUEL CELL

EXEMPLARY PASSIVE SUPPORT OR FUEL CELL AND FRAME

EXEMPLARY PASSIVE SUPPORT OR FUEL CELL AND FRAME

EXEMPLARY PASSIVE SUPPORT OR FUEL CELL AND FRAME

EXEMPLARY PASSIVE SUPPORT OR FUEL CELL AND FRAME

EXEMPLARY PASSIVE SUPPORT OR FUEL CELL AND FRAME

EXEMPLARY PASSIVE SUPPORT OR FUEL CELL AND FRAME

FUEL CELL AND PASSIVE SUPPORT

TECHNICAL FIELD

The subject matter disclosed herein pertains to fuel cells, electrodes, electrolytes and frames for fuel cells or electrodes. Various fuel cells, electrodes and electrolytes rely on passive supports.

BACKGROUND

Fuel cells typically operate under conditions that are detrimental to their longevity. For example, a typical solid oxide fuel cell may operate at a temperature in excess of 700° C. At such temperatures, a variety of phenomena may cause degradation of fuel cell components. For example, metals, which are often used as electrode materials, can become mobile and agglomerate. Upon oxidation (e.g., during cooling), such agglomerates may increase in size and exert detrimental stresses on fuel cell components. Further, thermal expansion can cause significant component stresses. Thus, temperature associated degradation can reduce fuel cell efficiency and even render a fuel cell inoperable. Of course, other operating conditions may also cause fuel cell degradation. Thus, a need exists for fuel cells that can withstand and/or minimize various operating stresses, fuel cells that can operate at lower temperatures, fuel cells that do not generate significant temperature associated stresses. Various exemplary fuel cells, electrodes, and methods presented below address these and/or other needs.

SUMMARY

A fuel cell is disclosed that includes a passive support having a fine pore region disposed between a first coarser pore region and a second coarser pore region. An exemplary fuel cell has an electrolyte material positioned in the fine pore region and a first electrode material positioned in the first coarser pore region and a second electrode material positioned in the second coarser pore region. Other exemplary devices and/or methods are also disclosed.

DETAILED DESCRIPTION

The following Detailed Description discusses exemplary fuel cells, passive supports, anodes, cathodes, fuel cell arrangements or configurations, and frames for fuel cells or electrodes. Various exemplary methods for making or using such fuel cells or fuel cell components are also discussed.

Fuel Cells

A fuel cell can generate electricity and heat by electrochemically reacting a fuel and an oxidizer using an ion conducting electrolyte for transfer of charged species without combustion. A typical fuel cell may generate an electrical potential through conversion of energy stored in a fuel (e.g., hydrogen, natural gas, methanol, etc.) and an oxidant (e.g., oxygen).

Figure 1:
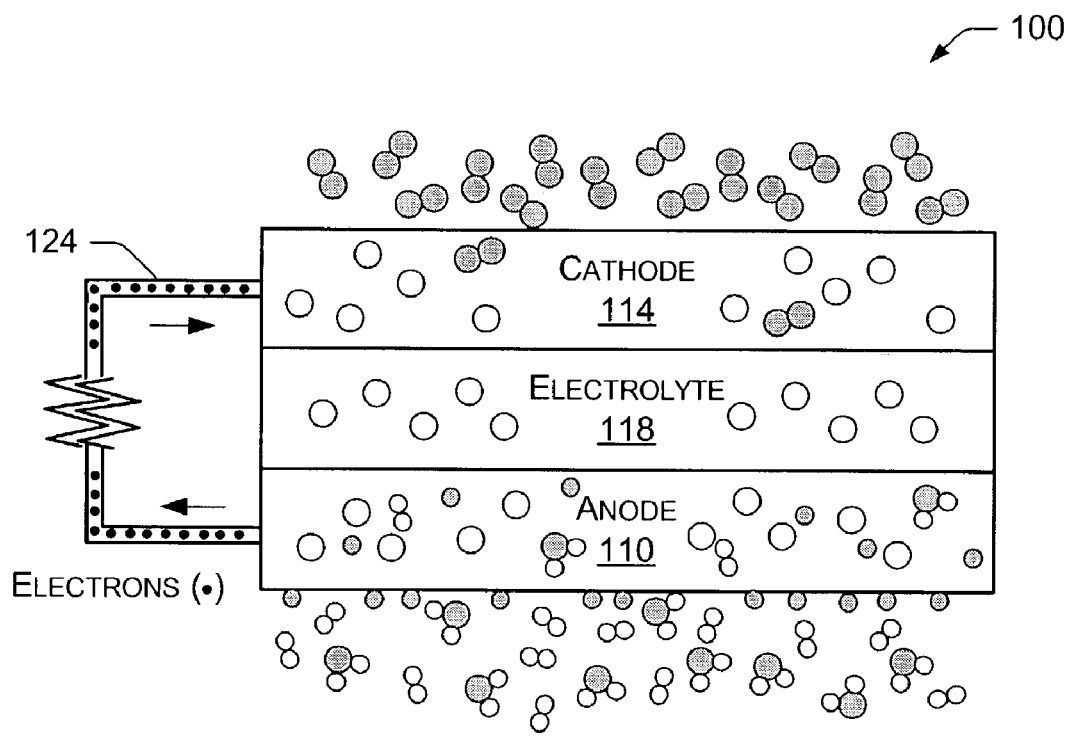
FIG. 1 shows a diagrammatic illustration of a fuel cell.
Figure 1:
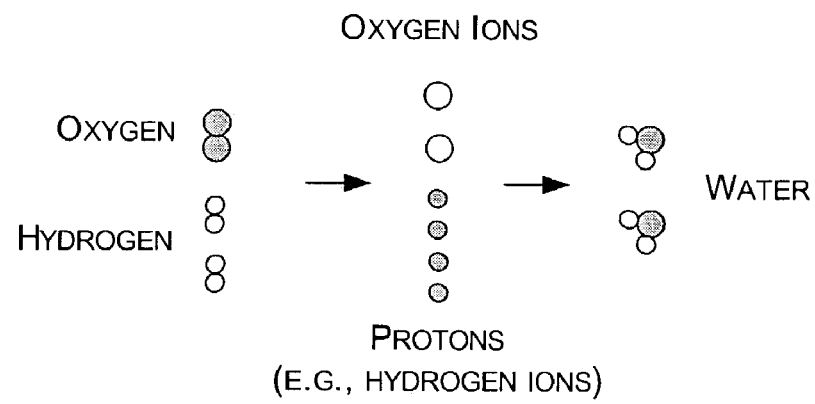

FIG. 1 shows a prior art solid oxide fuel cell 100. The fuel cell 100 includes an anode 110, a cathode 114 and an electrolyte 118. The anode 110 and the cathode 114 are electrodes while the electrolyte 118 serves as a type of membrane. In a typical operation of the fuel cell 100, an oxidant containing gas such as air is provided to the cathode 114, which may be referred to as an "air electrode", while a fuel is provided to the anode 110, which may be referred to as a "fuel electrode". For example, the cathode 114 may receive oxygen (from air) and the anode 110 may receive hydrogen (and optionally carbon monoxide, methane and other hydrocarbons). In this example, oxygen and hydrogen react to form water. This reaction is exothermic and it has an associated potential whereby the fuel cell 100 provides a flow path for electrons according to the potential.

Essential to operation of the fuel cell 100 is the electrolyte 118. As mentioned, the electrolyte 118 acts as a type of membrane, for example, an ion-conducting membrane. In the example given, the electrolyte 118 is an oxygen ion conducting membrane. If $H_2$ is used as a fuel, two protons or hydrogen ions are formed at the anode 110 from each $H_2$ molecule due to removal of electrons. An electron flow path or circuit 124 allows these electrons to become available at the cathode 114, which helps to drive oxygen ion formation from $O_2$. Oxygen ions conduct or permeate the electrolyte 118 and the anode 110, where the oxygen ions form water with protons or hydrogen ions. The electrochemical process may be represented by the following reaction equations:

$$O_2 + 4e^- \rightarrow 2O^{2-}$$

$$2H_2 \rightarrow 4H^+ + 4e^-$$

$$4H^+ + 2O^{2-} \rightarrow 2H_2O$$

At a temperature of 25° C. and a pressure of 1 ATM, a hydrogen-oxygen fuel cell according to the reaction equations has an equilibrium electromotive force (e.m.f.) of approximately 1.2 V.

In general, an electrolyte should have a high transport rate for desired ionic species while preventing transport of unwanted species. Various ceramics (e.g., electroceramics) have properties suitable for use as electrolyte. For example, a group of electroceramics, referred to sometimes as "fast ion conductors", "rapid ion conductors" or "superionic conductors", may support high transport rates for desired ionic species. A commonly used ceramic for oxygen ion ion-conducting membranes is yttria stabilized zirconia (YSZ). For an YSZ electrolyte to provide sufficient oxygen ion conductivity, fairly high temperatures are required (e.g., typically greater than 700° C.), even for a thin electrolyte (e.g., less than approximately 10 μm). Of course, numerous costs are associated with operation at such high temperatures. For example, high cost alloys (e.g., superalloys, etc.) may be required as a fuel cell housing thereby increasing cost substantially. Stresses at such operating temperatures may also degrade anodes, cathodes and/or electrolytes and thereby increase cost. For example, a cathode may have a coefficient of thermal expansion that differs from that of an electrolyte. In such a situation, substantial shear stresses may develop at the interface between the cathode and the electrolyte and cause microfractures of the cathode and/or the electrolyte which, in turn, may diminish interfacial contact area and/or the ability of the electrolyte to reject unwanted species.

Further, operating temperatures and/or temperature cycling may have a detrimental impact on anode, cathode and/or electrolyte characteristics. For example, one or more metal components in an anode may have a tendency to agglomerate above certain temperatures. Temperature and/or oxidation-reduction cycling may also promote agglomeration. Agglomeration is known to occur in Ni—YSZ cermet anodes of solid oxide fuel cells and to be generally related to factors such as current density and fuel utilization. For example, evenly distributed nickel particles are desirable to maximize the interface or three-phase-boundary (TPB) between an anode and an electrolyte. Agglomeration occurs throughout an anode and causes an increase in "particle size" and a reduction in evenness of particle distribution. These effects decrease effective TPB and thereby increase anode losses. Eventually, a disparate distribution may result that wholly compromises interparticle (or interagglomerate) conductivity.

An agglomerate may further degrade an electrode upon oxidation. Oxidation typically occurs during and after cooling (e.g., as a part of a fuel cell's operational cycling). In Ni—YSZ cermet anodes, Ni particles or agglomerates typically oxidize during and/or after cooling. Upon oxidation, the particles or agglomerates increase in size. After a few heating and cooling cycles particles or agglomerates may become large enough to exert significant forces (e.g., stress) on, in this example, the ceramic YSZ matrix. Thus, oxidation and/or agglomeration may degrade or break a matrix and render an electrode inoperable or prohibitively inefficient.

Thus, as mentioned in the Background section, a need exists for fuel cells that can withstand and/or minimize various operating stresses (e.g., reduction, oxidation, temperature, cycling, etc.), fuel cells that can operate at lower temperatures, fuel cells that do not generate significant temperature associated stresses. Various exemplary fuel cells described herein meet these and/or other needs.

To lower the operating temperature, either the conductivity of YSZ must be improved, or other suitable electrolyte materials must be used to substitute or augment YSZ. In general, conductivity is a function of electrolyte thickness wherein conductivity decreases with increasing thickness; thus, a thinner electrolyte may have less overall resistance, noting that the electrolyte typically has a resistance higher than an anode or a cathode. Thin film technologies have allowed for production of dense electrolytes having thicknesses of between, for example, approximately 0.5 μm and approximately 5 μm. Techniques for producing such electrolytes include chemical vapor deposition (CVD), which has been used to create electrolytes having a thickness of approximately 1 μm, atomic layer deposition (ALD), which has been used to create electrolytes having a thickness of approximately a few atomic layers, and other techniques, some of which are mentioned below. In addition, some of these techniques may be used to deposit electrode material. In various exemplary fuel cells, or components thereof, electrode and/or electrolyte may have larger thicknesses, for example, of approximately 100 μm or more. Film deposition techniques such as tape casting, screen-printing, etc., have been used to deposit electrode material and/or electrolyte material in thickness up to and beyond 100 μm. Further, an electrolyte should be "fully dense" to avoid short circuits due to passage of unwanted species through the electrolyte.

For a solid oxide fuel cell (SOFC), a ceramic and metal composite, sometimes referred to as a cermet, of nickel-YSZ may serve as an anode while Sr-doped lanthanum manganite ($La_{1-x}Sr_xMnO_3$) may serve as a cathode. Of course various other materials may be used for the anode 110 or the cathode 114. To generate a reasonable voltage, a plurality of fuel cells may be grouped to form an array or "stack". In a stack, an interconnect is often used to join anodes and cathodes, for example, an interconnect that includes a doped lanthanum chromite (e.g., $La_{0.8}Ca_{0.2}CrO_3$). Of course other materials may be suitable.

It is to be understood that a fuel cell may be one of solid oxide fuel cells (SOFCs), proton conducting ceramic fuel cells, alkaline fuel cells, polymer electrolyte membranes (PEM) fuel cells, molten carbonate fuel cells, solid acid fuel cells, direct methanol PEM fuel cells and others (see, e.g., other examples below). Various exemplary fuel cells presented herein are solid oxide fuel cells.

An electrolyte may be formed from any suitable material. Various exemplary electrolytes as presented herein are at least one of oxygen ion conducting membrane electrolytes, proton conducting electrolytes, carbonate ($CO_3^{2-}$) conducting electrolytes, $OH^-$ conducting electrolytes, hydride ion ($H^-$) conducting and mixtures thereof. Regarding hydride ion electrolyte fuel cells, advances have been as to a molten hydride electrolyte fuel cell.

Yet other exemplary electrolytes are at least one of cubic fluorite structure electrolytes, doped cubic fluorite electrolytes, proton-exchange polymer electrolytes, proton-exchange ceramic electrolytes, and mixtures thereof. Further, an exemplary electrolyte is at least one of yttria-stabilized zirconia, samarium doped-ceria, gadolinium doped-ceria, $La_aSr_bGa_cMg_dO_{3-\delta}$, and mixtures thereof, which may be particularly suited for use in solid oxide fuel cells.

Anode and cathode may be formed from any suitable material, as desired and/or necessitated by a particular end use. Various exemplary anodes and/or cathodes are at least one of metal(s), ceramic(s) and cermet(s). Some non-limitative examples of metals which may be suitable for an anode include at least one of nickel, copper, platinum and mixtures thereof. Some non-limitative examples of ceramics which may be suitable for an anode include at least one of $Ce_xSm_yO_{2-\delta}$, $Ce_xGd_yO_{2-\delta}$, $La_xSr_yCr_zO_{3-\delta}$, and mixtures thereof. Some non-limitative examples of cermets which may be suitable for an anode include at least one of Ni—YSZ, Cu—YSZ, Ni—SDC, Ni-GDC, Cu—SDC, Cu-GDC, and mixtures thereof.

Some non-limitative examples of metals which may be suitable for a cathode include at least one of silver, platinum, ruthenium, rhodium and mixtures thereof. Some non-limitative examples of ceramics which may be suitable for a cathode include at least one of $Sm_xSr_yCoO_{3-\delta}$, $Ba_xLa_yCoO_{3-\delta}$, $Gd_xSr_yCoO_{3-\delta}$.

Passive Supports

As described herein, passive supports may support anodes, cathodes and/or electrolytes. In general, a passive support does not conduct electrons or ions to any significant degree. Examples of passive supports include, but are not limited to, aluminum oxide-based supports, magnesium oxide-based supports, zirconium oxide-based supports, titanium oxide-based supports, silicon carbide-based supports, steel-based supports, and mixtures thereof. Of course, such materials may have any of a variety of phase structures. For example, an aluminum oxide-based support may include $\alpha$-$Al_2O_3$, $\gamma$-$Al_2O_3$, and/or other phases of $Al_2O_3$. An exemplary support may optionally includes magnesia and silica, for example, in a ratio of approximately 2:1 (e.g., two parts of magnesia $(MgO)_2$ to one part of silica $SiO_2$). Of course, other combinations of materials are also possible. Passive support material(s) may have desirable hydrophobicity-hydrophilicity, surface charge, and/or surface texture. Suitable supports can withstand temperatures associated with operation of various fuel cells described herein. Suitable supports may have any of a variety of geometries, such as, but not limited to, planar, tubular, cylindrical, and/or monolithic with one or more channels.

Figure 2A:
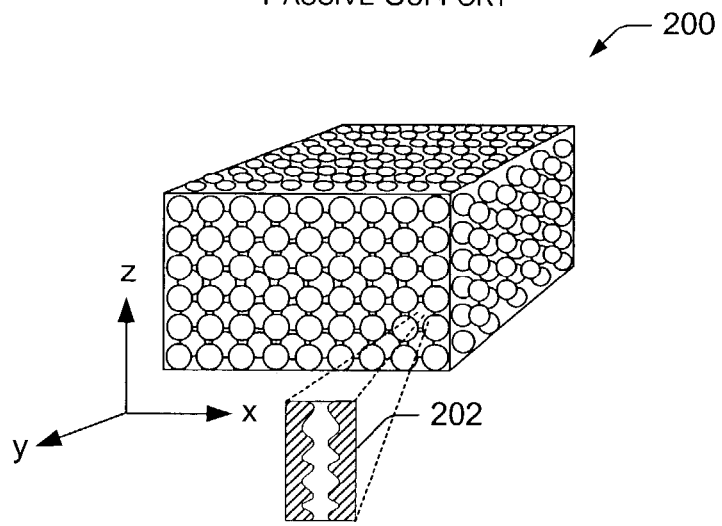
FIGS. 2A, 2B and 2C show perspective views of an exemplary isometric passive support, an exemplary asymmetric passive support, and an exemplary asymmetric passive support with a bounded layer having fine pores, respectively.
Figure 2B:
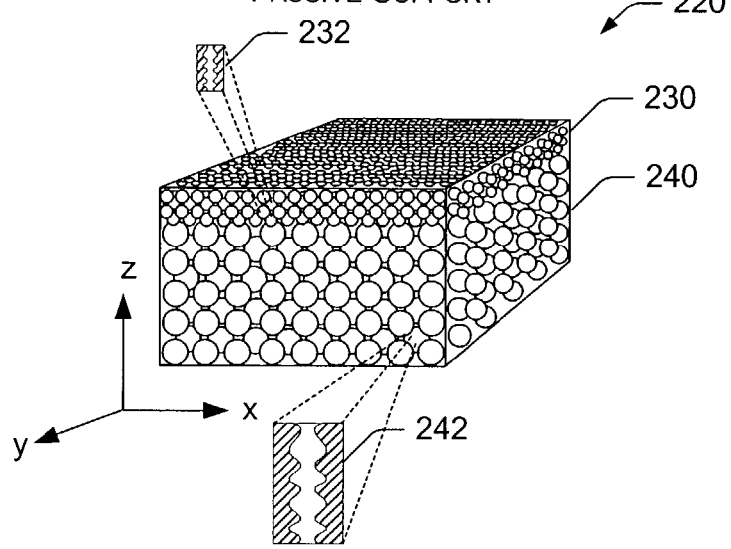

Passive supports are typically porous. Pores may be characterized by parameters such as pore volume, pore size, pore size distribution (e.g., mean pore size, etc.), and pore morphology, especially with respect to one or more passive support dimensions. Passive supports may also have some non-contiguous (e.g., dead end) and/or inaccessible pores (e.g., closed cells or voids). Of course, voids do not add to the usable porosity or total volume of usable pores. FIG. 2A shows an exemplary passive support 200 having substantially isometric pore morphology (e.g., over volume of the support 200 with respect to the exemplary coordinate system) while FIG. 2B shows an exemplary passive support 220 having asymmetric pore morphology with respect to a dimension of the support such as a trans-support thickness (e.g., along the z-axis) (e.g., pore size can vary with respect to one or more dimensions of the support). Such supports may have average pore sizes of approximately 0.01 µm (e.g., approximately 10 nanometers or approximately 100 Å) to approximately 100 µm (e.g., approximately 0.1 mm) or more. Such supports may have any of a variety of porosities (e.g., macro, micro, meso, homogeneous, heterogeneous, interconnected, open-cell, closed-cell, dead-end, etc.) and such supports may have any of a variety of tortuosities (e.g., short, long, angular, and linear transport lengths, etc.). Any particular pore may have asymmetry and/or symmetry in one or more dimensions; note that the terms "asymmetry" or "asymmetric" and "symmetry" or "symmetric" may apply to a geometric description of any particular pore, as well as to pore morphology of a passive support, wherein pore morphology refers to how pore characteristics vary in a passive support. In general, a passive support has a definable total volume that is approximately equal to the sum of individual pore volumes (open volume) and occluded volume (volume occupied by passive support material). Of course, occluded volume may also include void volume where appropriate.

The substantially isometric passive support 200 includes an exemplary enlarged cross-sectional view of the support 202. In this example, the pores are aligned substantially along the z-axis (e.g., from top to bottom). Of course, pores may have other shapes and/or be interconnected across other dimensions (e.g., x, y, etc.) as well.

The asymmetric passive support 220 has a first mean pore size over a first thickness or region 230 and a different, second mean pore size over a second thickness or region 240 of the passive support 220. The asymmetric passive support 220 includes an exemplary enlarged cross-sectional view of the support 232 for the first region 230 and an exemplary enlarged cross-sectional view of the support 242 for the second region 240. In these examples, the pores are aligned substantially along the z-axis (e.g., from top to bottom). Of course, pores may have other shapes and/or be interconnected across other dimensions (e.g., x, y, etc.) as well. For example, porosity, tortuosity, pore volume and/or occluded volume may vary over one or more dimensions or regions of the passive support 220. Porosity typically approximates open porosity because closed or inaccessible porosity (e.g., voids) is generally undesirable and a small fraction of total porosity. An exemplary asymmetric passive support includes aluminum oxide or alumina. For example, an asymmetric passive support may have an $\alpha$-$Al_2O_3$ phase that defines a region having a large mean pore size and a $\gamma$-$Al_2O_3$ phase that defines a region having a small mean pore size. Of course an asymmetric passive support may include other materials and/or phases (see, e.g., aforementioned materials).

Figure 2C:
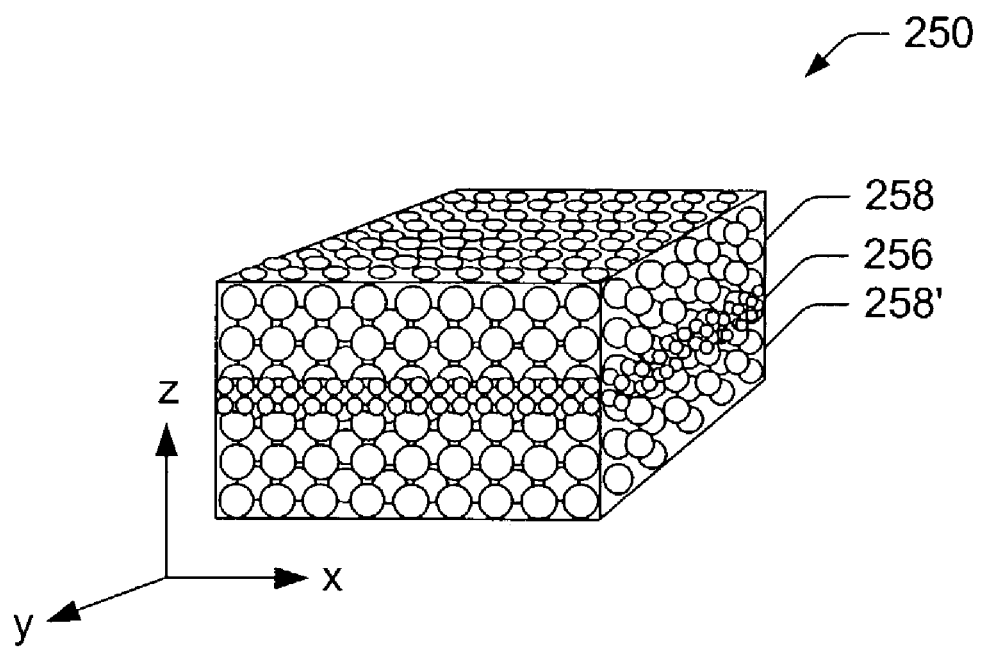

FIG. 2C shows an exemplary asymmetric passive support 250 that has a first mean pore size over a first thickness or region 256, a different, second mean pore size over a second thickness or region 258, and a third mean pore size over a third thickness or region 258'. The third mean pore size of the third thickness or region 258' is optionally approximately the same as the second mean pore size. Various passive support parameters (e.g., discussed with respect to the passive support 220 and the passive support 240) may vary in any or all of the three regions 256, 258, 258' of an exemplary asymmetric passive support. In general, the exemplary asymmetric passive support 250 has a fine pore region bounded by two coarser pore regions.

Passive Supports and Agglomeration

As mentioned, agglomeration can degrade performance of a fuel cell. In particular, agglomeration is known to be associated with a decrease in anode performance. Various exemplary anodes presented herein exhibit (i) no agglomeration, (ii) minimal agglomeration and/or (iii) predictable agglomeration. Further, various exemplary anodes presented herein exhibit asymmetric agglomeration. Yet further, use of a passive support can enhance stability of an electrode and/or an electrolyte.

Figure 3:
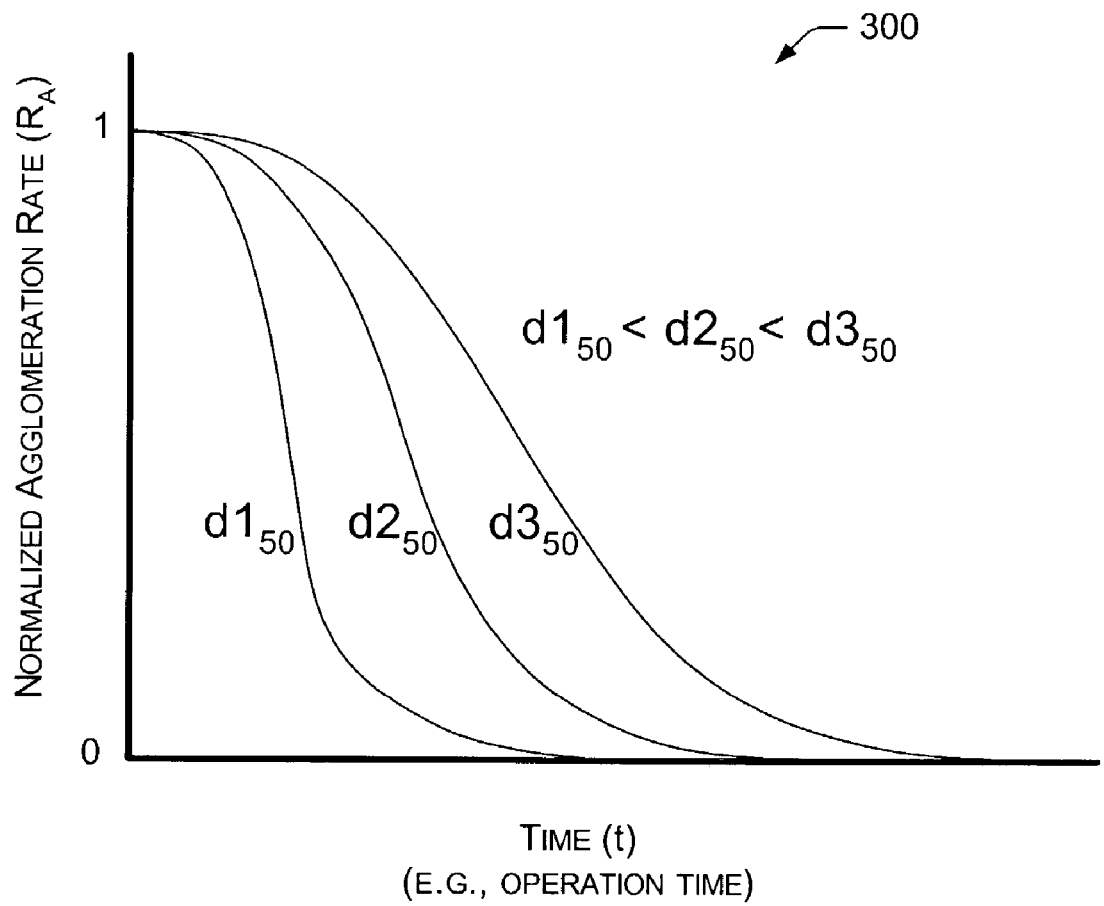
FIG. 3 shows an exemplary plot of agglomeration rates with respect to time for various mean pore sizes.

FIG. 3 shows a plot 300 of normalized agglomeration rate versus time. The time may be an operation time (e.g., a fuel cell operation time) or another time where agglomeration may occur (e.g., a reduction time, etc.). Three curves are shown for different mean passive support pore sizes: $d1_{50}$, $d2_{50}$ and $d3_{50}$, where $d1_{50} < d2_{50} < d3_{50}$. According to the plot 300, the agglomeration rate decreases with respect to time. Further, the agglomeration rate decreases more quickly for a smaller mean pore size (e.g., $d1_{50}$) compared to a larger mean pore size (e.g., $d3_{50}$). The relationship between pore size and agglomeration is at least in part due to steric limitations whereby a passive support with smaller pores helps to preserve an even dispersion of electrode and/or electrolyte material. In addition, the total agglomeration may be approximated by the area under a curve or the integral of the agglomeration rate with respect to time. Thus, a judicious selection of passive support pore size can be used to limit agglomeration and/or yield predictable agglomeration. Of course, other passive support characteristics (e.g., tortuosity, pore morphology, etc.) may be selected to affect agglomeration rate and/or total agglomeration.

Factors such as operation temperature, melting temperature of material deposited into pores of a passive support and corresponding Tamman temperatures (e.g., approximately 0.5 times the bulk melting temperature in degrees K), etc., are optionally used in selecting a passive support and/or characteristics thereof. In particular, pore size (e.g., mean pore size), pore asymmetry in the passive support and/or pore wall surface properties are optionally used in selecting a passive support. For example, an exemplary asymmetric support has pores having cross-sections such as those shown in the enlarged cross-sectional views 232, 242 of FIG. 2B to minimize or control agglomeration of any material deposited into such pores. Regarding pore wall surface properties, some surface properties promote mobility and/or agglomeration while other surface properties hinder mobility and/or agglomeration.

Passive Supports and Thermal Expansion

As mentioned, thermal expansion and mismatch of thermal expansions between fuel cell components (e.g., interconnects, electrodes, electrolyte, etc.) can degrade performance of a fuel cell. In particular, thermal expansion and/or thermal expansion mismatches are known to be associated with a decrease in fuel cell performance. Various exemplary electrodes and/or electrolytes presented herein exhibit (i) matched or approximately matched thermal expansions and/or (ii) minimal thermal expansion. Further, various exemplary electrodes and/or electrolytes presented herein exhibit asymmetric thermal expansion. For example, an asymmetric thermal expansion may have a thermal expansion that approaches that of another fuel cell component in a direction approaching the other fuel cell component (e.g., an electrode that has thermal expansion approximating an electrolyte near the electrode/electrolyte interface). Yet further, various exemplary anodes may exhibit agglomeration characteristics as described above and matched, minimal and/or asymmetric thermal expansion.

Figure 4:
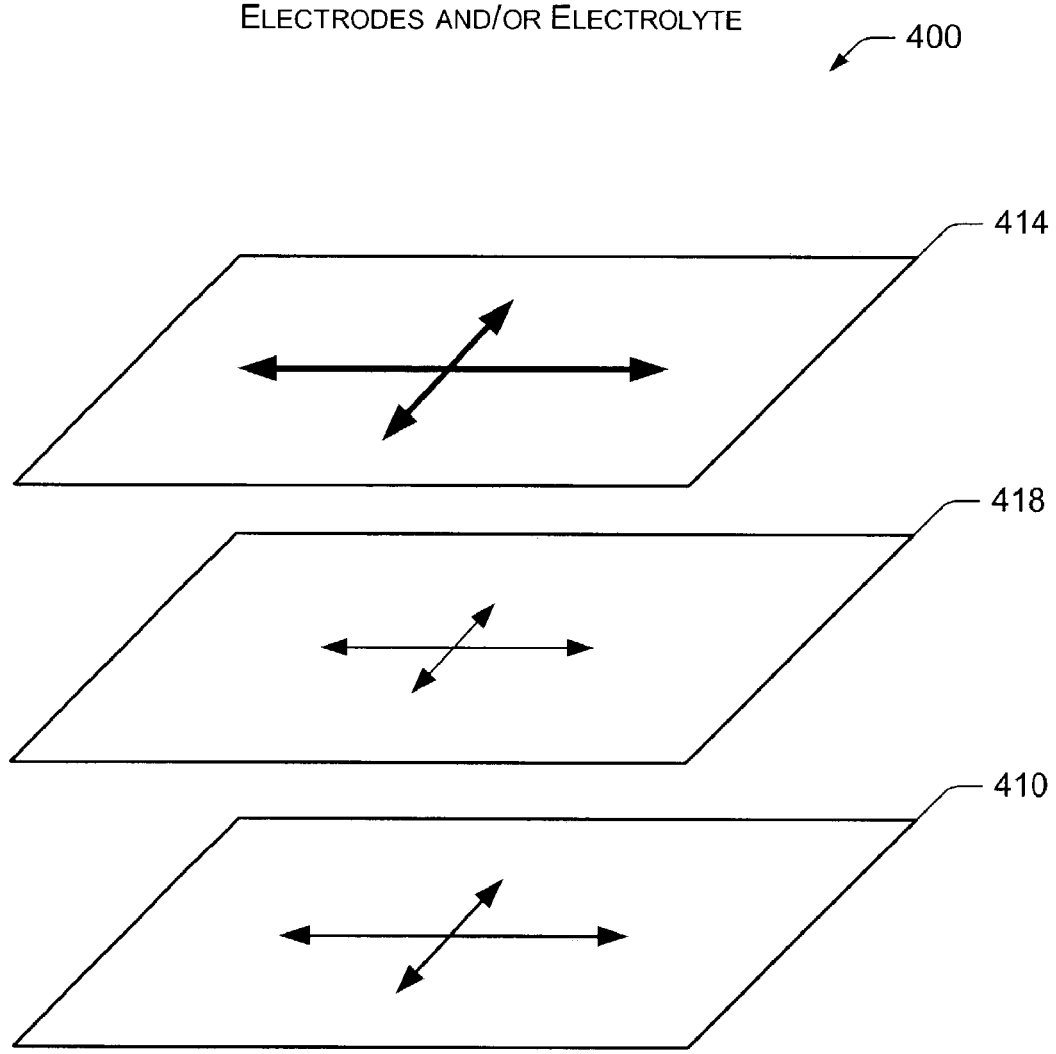
FIG. 4 shows a diagrammatic illustration of various electrode and/or electrolyte surfaces of a fuel cell that include thermal expansion vectors.

FIG. 4 shows planar representations 400 of a lower electrode 410, an upper electrode 414 and an electrolyte 418, which is disposed between the lower electrode 410 and the upper electrode 414. A fuel cell based on a passive support such as the passive support 240 of FIG. 2C may contain lower electrode, upper electrode and electrolyte layers. Planar vectors appear on the planar representations wherein line thickness and length correspond to thermal expansion rates and/or thermal expansion. While planar representations are suited to illustrate most issues associated with the electrode-electrolyte interfaces, thermal expansion may also occur along one or more other dimensions (e.g., volumetric thermal expansion). A typical equation used for linear thermal expansion equates change in linear distance ($\Delta L$) with a dimensional coefficient of thermal expansion ($\alpha$), a length (L) and a temperature differential ($\Delta T$). A typical equation used for volumetric thermal expansion equates change in volume ($\Delta V$) with a volumetric coefficient of thermal expansion ($\beta$), a volume (V) and a temperature differential ($\Delta T$).

Figure 5:
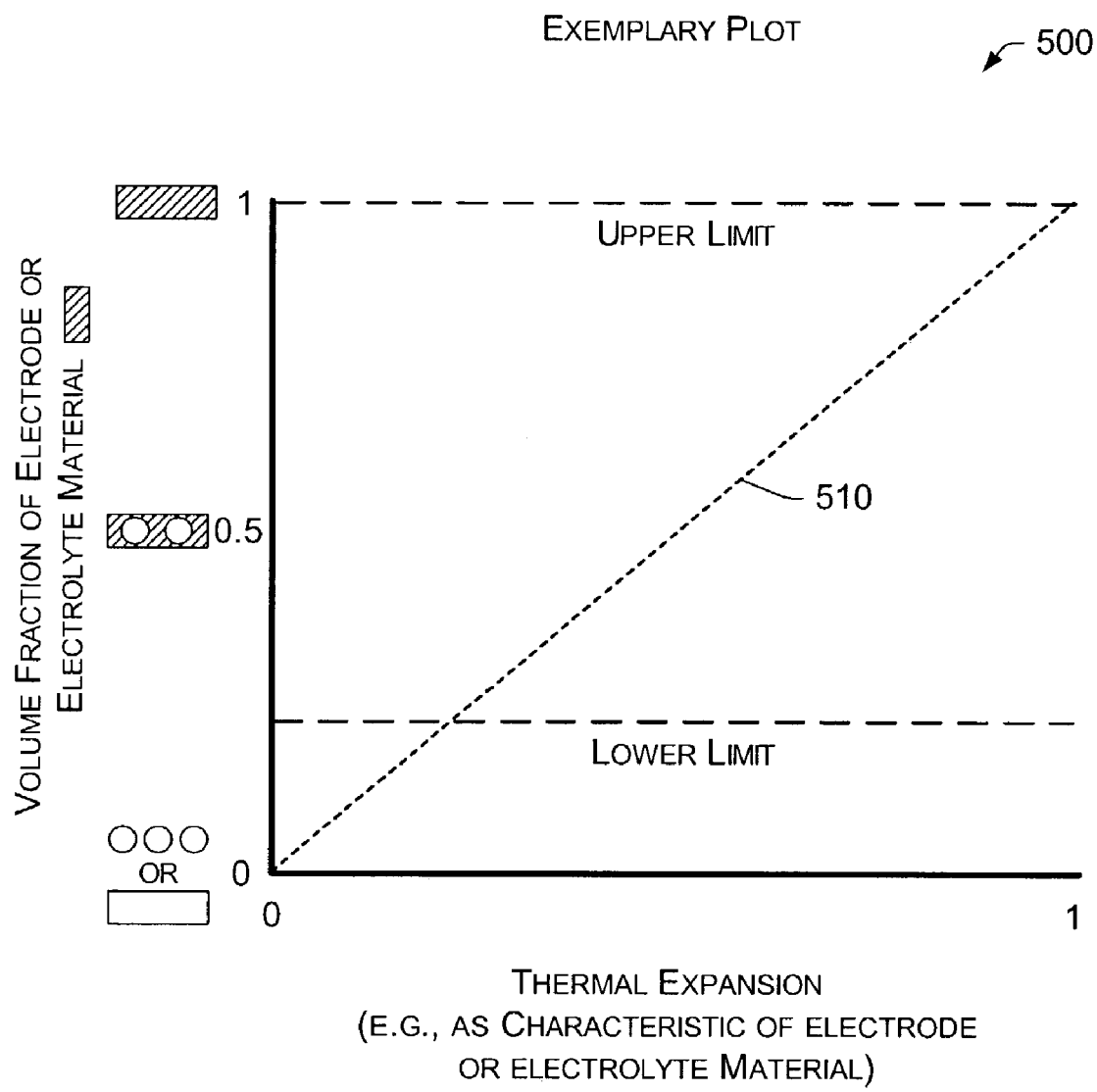
FIG. 5 shows an exemplary plot of volume fraction versus thermal expansion for an electrode and/or an electrolyte of a fuel cell.

FIG. 5 shows an exemplary plot 500 of volume fraction of electrode or electrolyte material that can be placed in pores of a passive support versus thermal expansion of a passive support having such a material deposited within as being characteristic of the electrode or electrolyte material. The line 510, which may be a curve, represents a relationship between volume fraction and thermal expansion characteristics. A volume fraction of zero may correspond to a passive support that does not have any electrode or electrolyte material deposited within (see, e.g., schematic at a volume fraction of zero) or it may correspond to a passive support that does not have accessible volume. In this instance, such a region will have thermal expansion characteristics (e.g., expansion, stresses, etc.) that depend on the passive support. A volume fraction of one-half may correspond to a total volume half occupied by passive support and half occupied or occupiable by electrode or electrolyte material (see, e.g., schematic at a volume fraction of one-half). In this instance, thermal expansion characteristics for such a region will depend on the passive support and the material deposited within the passive support. A volume fraction of one may correspond to a total volume occupied entirely by electrode or electrolyte material (i.e., a volume not having passive support within). In this instance, thermal expansion characteristics for such a region will depend on the electrode or electrolyte material. Accordingly, a volume fraction of zero corresponds to a passive support having thermal expansion characteristics that do not depend on electrode and/or electrolyte, unless a boundary of the passive support has an adjacent electrode and/or electrolyte. Further, a volume fraction of one corresponds to an electrode and/or electrolyte having thermal expansion characteristics that do not depend on passive support, unless a boundary of the electrode and/or electrolyte has an adjacent passive support.

In general, various exemplary electrodes and/or electrolytes presented herein will have electrode or electrolyte material deposited within a porous passive support and/or electrode or electrolyte material deposited adjacent to a passive support. Hence, a plot such as that shown in FIG. 5 may assist in selecting a passive support having suitable thermal expansion characteristics. Further, a lower limit may exist as to volume fraction that may be occupied by electrode or electrolyte material. In essence, a volume fraction less than the lower limit may be impractical for any of a variety of reasons. FIG. 5 shows an arbitrary lower limit, which may be adjusted according to passive support, electrode and/or electrolyte characteristics.

Selection of Pore Characteristics

Figure 6:
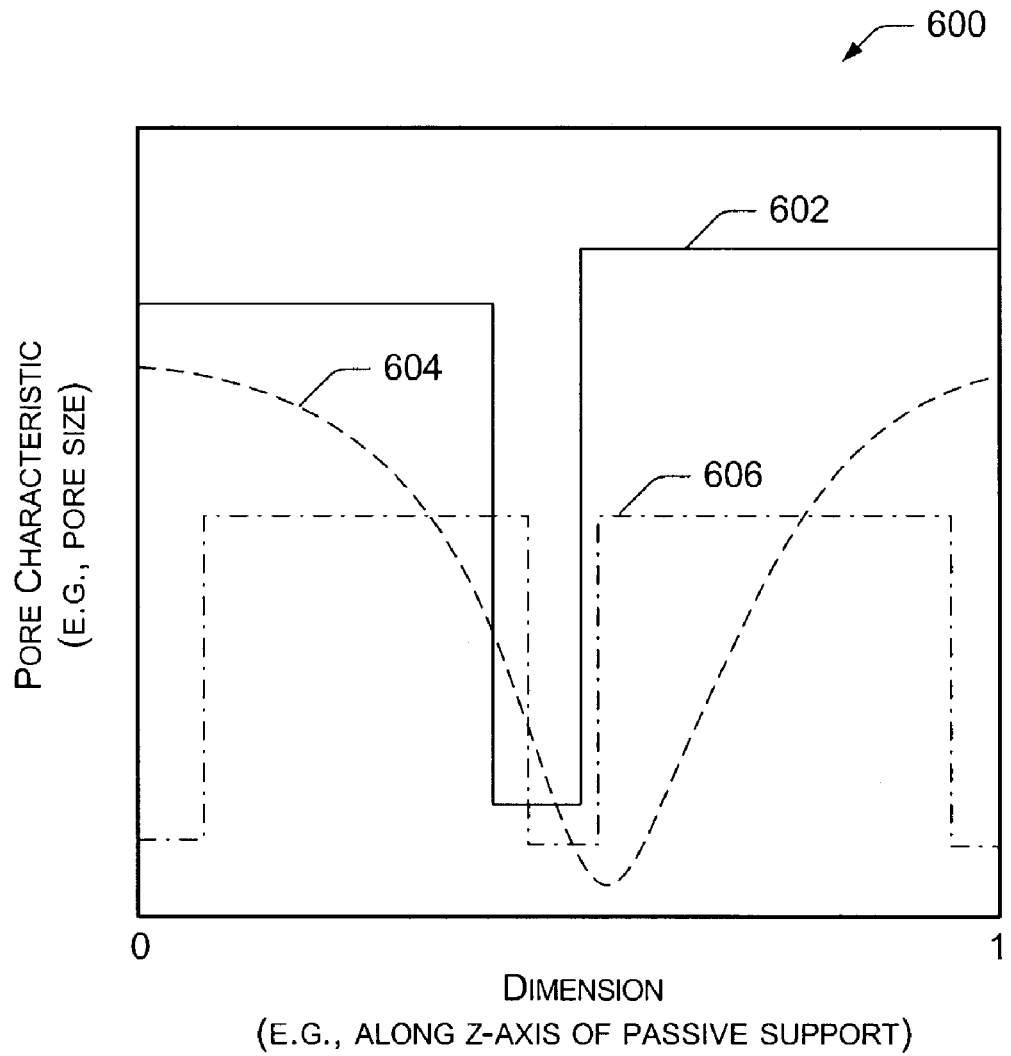
FIG. 6 shows an exemplary plot of a pore characteristic (e.g., pore size) versus a dimension of a passive support.

As described above and/or as shown in FIGS. 3, 4 and 5, pore characteristics of passive supports can affect agglomeration and/or thermal expansion. Pore characteristics may also affect stability. FIG. 6 shows a plot 600 of exemplary passive support pore characteristics (e.g., pore size) with respect to a dimension of the passive support. The dimension may be along a z-axis, for example, as shown in FIGS. 2A, 2B and 2C, wherein z=0 is at or near a fuel or air supply surface (e.g., a first electrode outer boundary) and z=1 is at or near another fuel or air supply surface (e.g., a second electrode outer boundary). For example, curve 602 corresponds to a passive support having a pore size that diminishes step-wise, with respect to at least one dimension, from a first mean pore size to a second mean pore size and then increases to a third mean pore size. In another example, curve 604 corresponds to a passive support having a pore size that diminishes, with respect to at least one dimension, to a minimum mean pore size and then increases to larger mean pore sizes. In yet another example, curve 606 corresponds to a passive support having a pore size that diminishes approximately step-wise with respect to at least one dimension. A passive support according to curve 606 may include, for example, first, second and third electrolyte layers (e.g., see the exemplary fuel cell and passive support 1100 of FIG. 11B). Of course, an exemplary passive support can have a pore size that increases and/or decreases in one dimension in one or more manners while having a pore size that increases and/or decreases in another dimension in one or more same or other manners. Of course, an exemplary asymmetric support may include pores having cross-sections such as those shown in the enlarged cross-sectional views 232, 242 of FIG. 2B to minimize or control agglomeration of any material deposited into such pores and/or to minimize, match or control thermal expansion of an electrode, an electrolyte, a fuel cell, etc.

Figure 7:
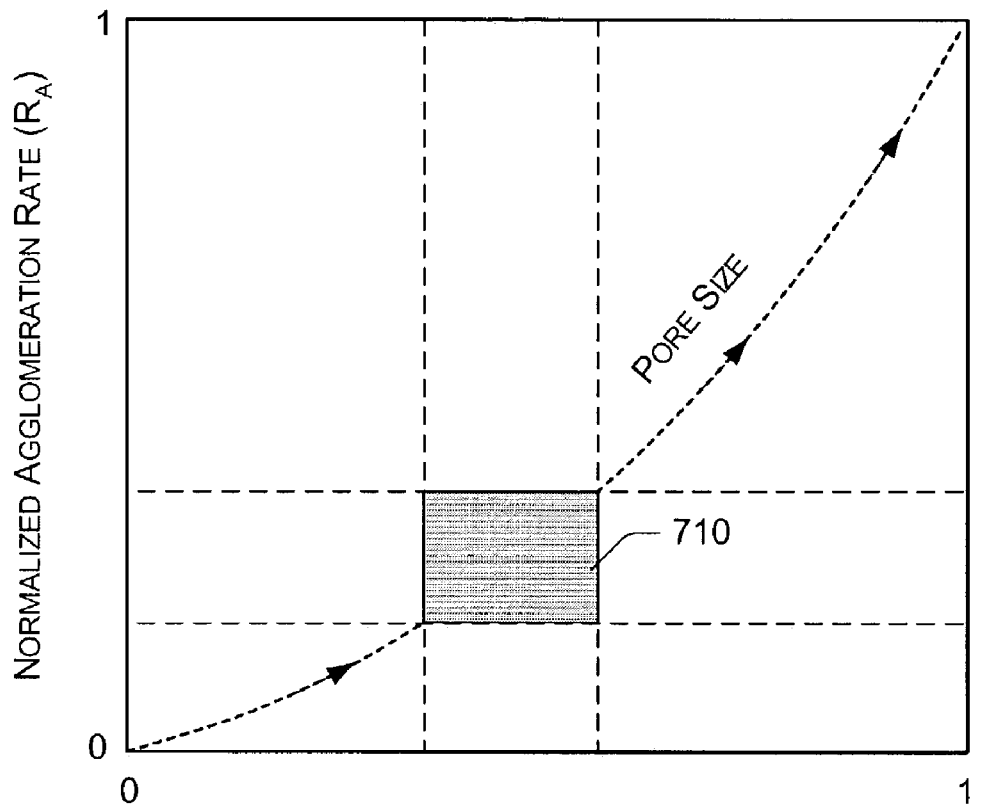
FIG. 7 shows an exemplary plot of agglomeration versus thermal expansion for various pore sizes of a passive support.

FIG. 7 shows an exemplary plot 700 of passive support pore size (e.g., mean pore size, etc.) and normalized agglomeration rate versus thermal expansion. Such a plot, or related data, can aid in the selection of passive support pore size. For example, a shaded region 710 corresponds to acceptable thermal expansion and agglomeration characteristics at or near an electrode and electrolyte boundary. Thus, an exemplary electrode and/or electrolyte has, at or near an electrode and electrolyte boundary, a passive support with a mean pore size that falls within the region 710. Of course, an asymmetric passive support (e.g., a passive support having asymmetric pore morphology) may have other mean pore sizes as well.

Exemplary Anodes

An exemplary anode relies on a passive support such as but not limited to the asymmetric passive support 250 shown in FIG. 2C. The characteristics of the passive support are optionally selected to account for agglomeration and/or thermal expansion. For example, a pore size (e.g., mean pore size) is selected to minimize agglomeration, to minimize thermal expansion and/or to approximately match thermal expansion of an electrolyte.

Figure 8:
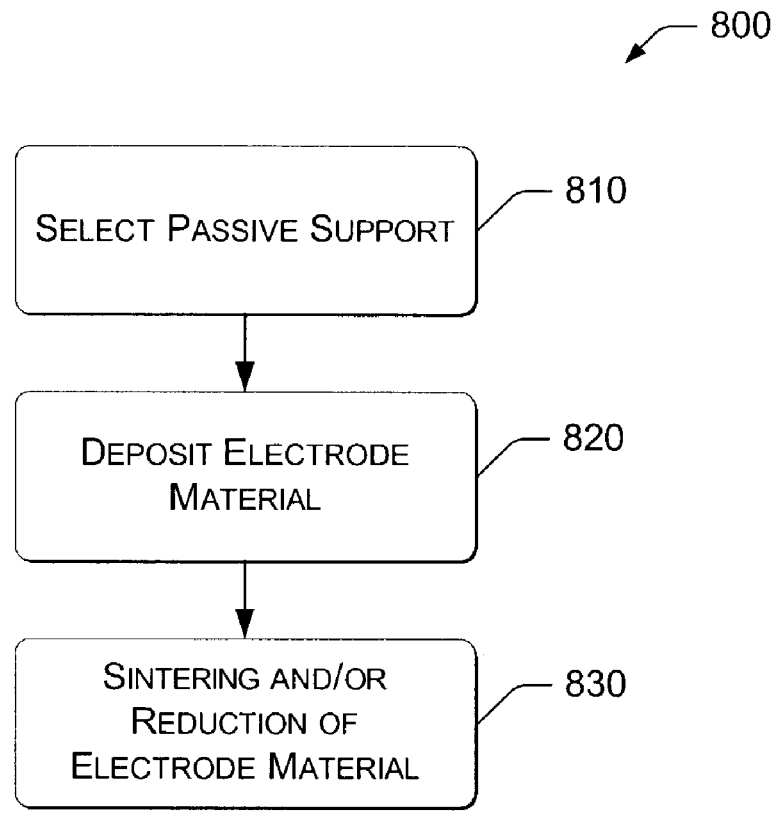
FIG. 8 shows a block diagram of an exemplary method for making an electrode based on a passive support.

FIG. 8 shows an exemplary method 800 for making an anode that relies on a passive support. The method 800 includes selection of a passive support 810, for example, as discussed above. Once selected, the method 800 continues with deposition of a material suitable for use as an anode into the pores of the passive support 820. The deposition may occur via any suitable deposition process, including physical and/or chemical deposition processes (e.g., atomic layer deposition (ALD), chemical vapor deposition (CVD), electrochemical vapor deposition (EVD), electrolytic deposition (ELD), etc.). Further, the material is optionally deposited as a liquid or a paste (e.g., extrusion of a paste into or through pores of a passive support, etc,). Sometime after deposition, the exemplary method 800 continues with sintering and/or reduction of deposited material 830.

The reduction of deposited material 830 may occur during operation of an anode in a fuel cell and/or prior to operation of the anode in a fuel cell. For example, if the reduction occurs prior to operation of the anode in a fuel cell, then further agglomeration may be minimized and/or otherwise limited. Accordingly, an exemplary anode has a predetermined propensity to agglomeration that is at least in part determined by reduction prior to operation of the anode in a fuel cell. For example, a reduction procedure may take place prior to use of an electrode as an anode in an operational fuel cell. Of course, the predetermined propensity to agglomeration may also be based in part on selected pore size and/or pore asymmetry.

In addition, reduction of anode material typically creates secondary porosity. For example, if the anode material includes a metal oxide, then reduction of the metal oxide to metal will result in a decrease in volume. This decrease in volume translates to a decrease in filled void fraction of the passive support and hence an increase in effective porosity. While secondary porosity is not typically directly related to primary porosity of a passive support, selection of primary porosity (e.g., pore size) may aid in achieving a desirable secondary porosity. The creation of secondary porosity may affect transport of species through an anode. For example, if the deposited material fills the pores of a passive support to an extent where transport of one or more desired species is detrimentally minimized and/or otherwise limited, then creation of secondary porosity via reduction of anode material can allow for suitable levels of transport the one or more desired species.

Various procedures may occur prior to reduction of deposited material. For example, if the deposition deposits excess material, then removal of the excess material may occur. Further, sintering and/or annealing of the deposited material may occur. Yet further, deposition of an electrolyte material may occur, optionally followed by sintering and/or annealing. Of course, deposition of cathode material may occur as well, optionally followed by annealing and/or sintering.

Reduction may occur according to electrical, physical and/or chemical processes. For example, reduction may occur due to an applied electrical potential or due to being subject to a reducing chemical environment. Alternatives to reduction include other electrical, physical and/or chemical processes that act to create secondary porosity in an electrode, whether the electrode is a cathode or an anode. For example, secondary porosity may be created by adding a material prior to sintering wherein the material degrades upon sintering. Techniques that rely on adding a material to a green body or green paste are discussed below with respect to interconnects and may be suitable for creating secondary porosity.

Exemplary Cathodes

An exemplary cathode optionally relies on a passive support such as but not limited to the asymmetric passive support 240 shown in FIG. 2C. The characteristics of the passive support are optionally selected to account for agglomeration and/or thermal expansion. For example, a pore size (e.g., mean pore size) is selected to minimize agglomeration, to minimize thermal expansion and/or to approximately match thermal expansion of an electrolyte.

An exemplary method for making a cathode relies on a passive support. The method includes selection of a passive support, for example, as discussed above. Once selected, the method continues with deposition of a material suitable for use as a cathode into the pores of the passive support. The deposition may occur via any suitable deposition process, including physical and/or chemical deposition processes (e.g., ALD, CVD, EVD, ELD, etc.). Further, the material is optionally deposited as a liquid or a paste (e.g., extrusion of a paste into or through pores of a passive support, etc.). Various other procedures may occur at any time during the exemplary method. For example, if the deposition deposits excess material, then removal of the excess material may occur. Further, sintering and/or annealing of the deposited material may occur. For example, sintering that causes a decrease in density of the cathode material (e.g., an electrode material suitable for use as a cathode) may create secondary porosity. Yet further, deposition of an electrolyte material may occur, optionally followed by sintering and/or annealing. Of course, deposition of anode material may occur as well, optionally followed by annealing and/or sintering.

Exemplary Fuel Cells

Figure 9:
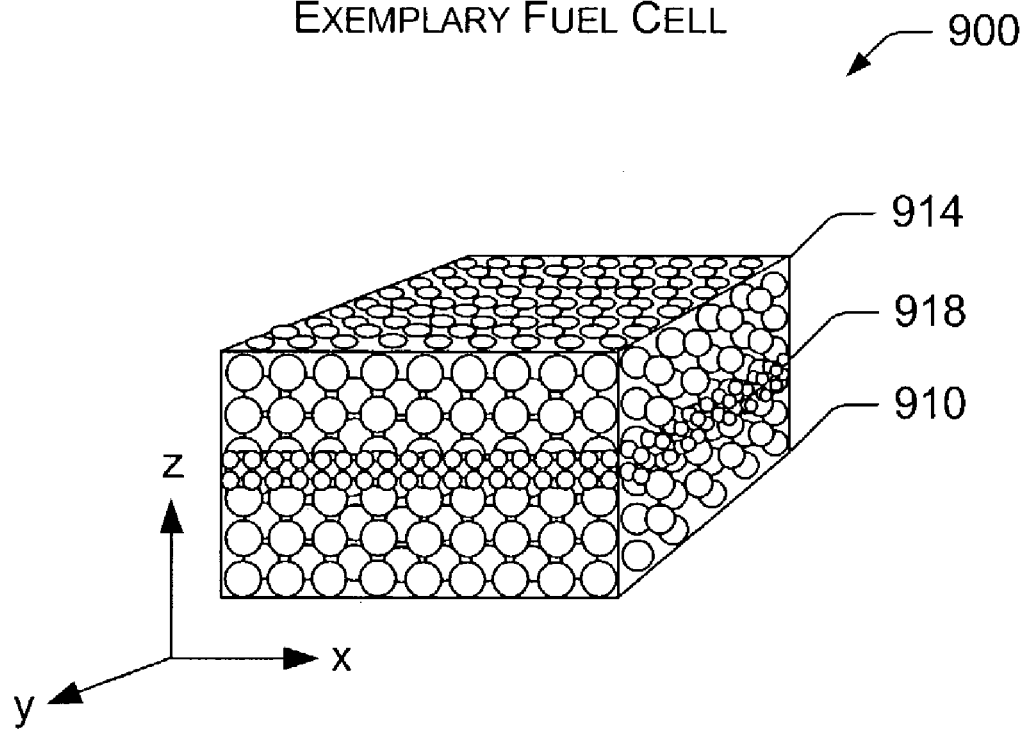
FIG. 9 shows a perspective view of an exemplary fuel cell having a passive support.

FIG. 9 shows an exemplary fuel cell 900 based on a passive support that includes a first electrode 910 (e.g., an anode or a cathode), a second electrode 914 (e.g., a cathode or an anode) and an electrolyte 918, which is disposed at least in part between the first and second electrodes 910, 914. In general, the electrolyte 918 occupies a fine pore region of the passive support that is bounded by electrodes that occupy comparatively coarse pore regions of the passive support.

In the exemplary fuel cell 900, the electrolyte 918 may occupy a region that has a thickness of approximately 250 µm down to approximately 200 nm (e.g., along a z-axis). Of course, a lesser or greater thickness may be used. Further, in this example, the mean pore size of this region is less than approximately 25 µm.

After deposition of electrode material into the passive support and optional removal of excess material and/or sintering, the resulting electrode 910 has a mean pore size of less than approximately 1 µm. In another example, the passive support has a porous region having a mean pore size of approximately 5 µm wherein after appropriate processing, the resulting electrode 910 has a mean pore size less than 1 µm and typically much less than 1 µm. A small mean pore size of a passive support and/or an electrode may further allow for a thinner electrolyte. For example, as a general rule, if an electrolyte is deposited onto a porous surface, then the thickness of the electrolyte should be approximately three times the mean pore size. Hence, in this example, the electrolyte may have a thickness of a few microns or less. Again, a thinner electrolyte typically promotes better ion conduction (e.g., oxygen ion transport, etc.).

In yet another example, an exemplary fuel cell includes a first electrode, an electrolyte adjacent to the first electrode and a second electrode adjacent to the electrolyte. In this exemplary fuel cell, the passive support is selected to limit agglomeration, thermal expansion and/or electrolyte thickness. The selection may also include selection of pore asymmetry (e.g., asymmetric pore morphology) as it relates to agglomeration, thermal expansion and/or electrolyte thickness. For example, an exemplary passive support includes a fine pore region having a mean pore size of approximately 50 nanometers to approximately 500 nanometers. Such an exemplary passive support is suitable for depositing of an electrolyte material therein. Secondary porosity of an electrode in such an exemplary fuel cell may include pores having mean pore size of approximately 50 nanometers to approximately 500 nanometers. Of course, in these two aforementioned examples, other pore sizes may be suitable.

In the exemplary fuel cell 900, the first electrode 910 is optionally an anode wherein the pore characteristics are selected to minimize agglomeration and the second electrode 914 is optionally a cathode wherein the pore characteristics are selected to limit thermal expansion. Yet further, the pore characteristics of the first electrode 910, at or near the boundary with the electrolyte 918, are selected to allow for an appropriate boundary with a thin electrolyte while the pore characteristics of the second electrode 914 are optionally selected to match thermal expansion of the electrolyte 918. Of course, the relevant thermal expansion may account for temperatures associated with fuel cell operation and/or operation cycles (e.g., on-off cycles, fuel feed cycles, etc.).

Figure 10:
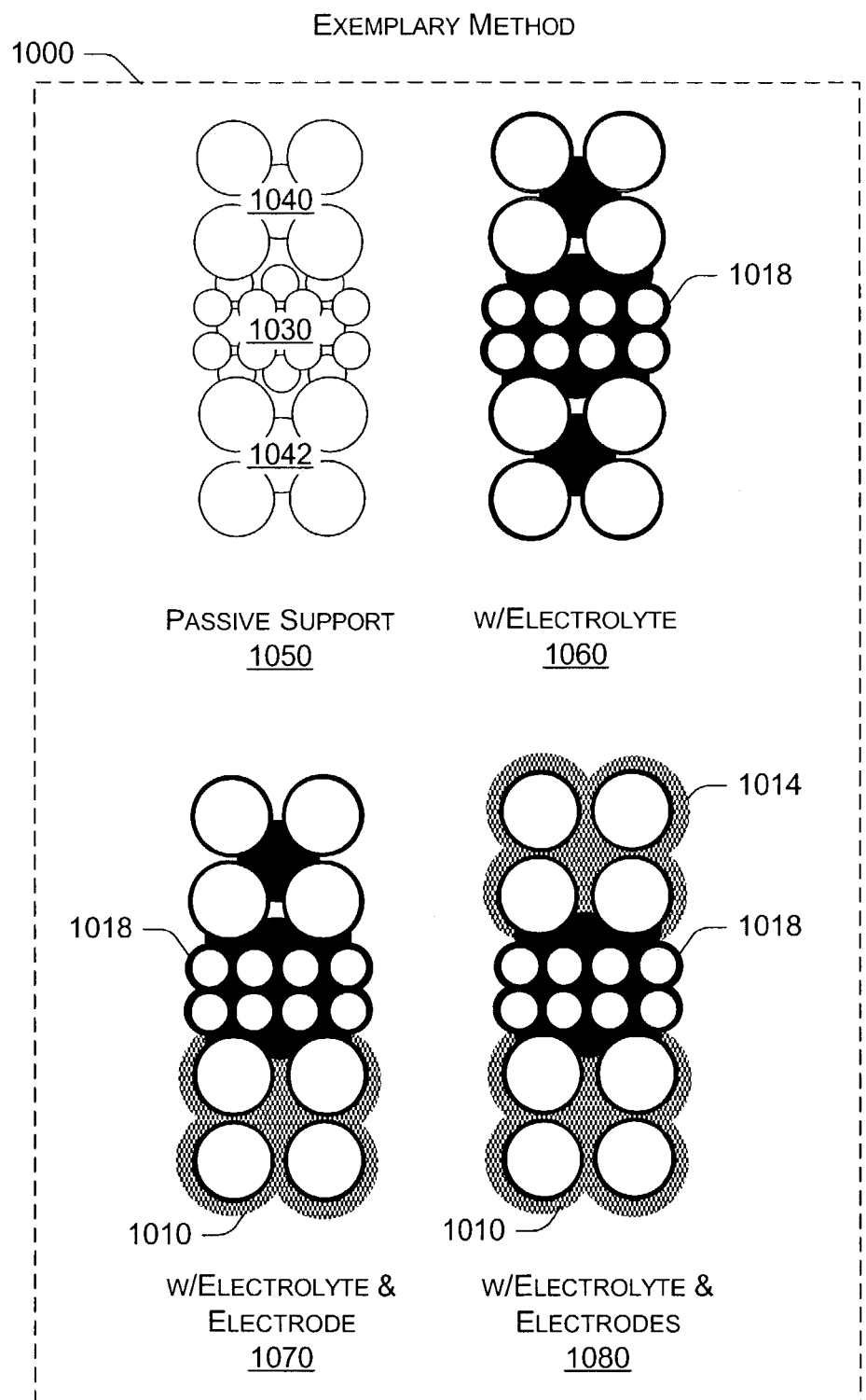
FIG. 10 shows an exemplary method and associated exemplary structures.

FIG. 10 shows an exemplary method 1000 and corresponding exemplary structures 1050, 1060, 1070, 1080. The method 1000 includes providing an asymmetric passive support 1050, wherein the passive support has a fine pore region 1030 bound between two coarser pore regions 1040, 1042. The method 1000 also includes depositing electrolyte material 1060, wherein electrolyte material 1018 is deposited throughout the fine pore region 1030 and the coarser pore regions 1040, 1042 of the asymmetric passive support. Of course, an alternative method may deposit electrolyte material throughout the fine pore region and only one of the coarser pore regions. In either instance, the depositing 1060 creates a dense electrolyte region within part or all of the pores of the fine pore region 1030. Further, the electrolyte material 1018 covers at least some of the available surface of one or both of the coarser pore regions 1040, 1042. The exemplary method 1000 further includes depositing a first electrode material 1070, wherein a first electrode material 1010 is deposited in one of the coarse pore regions 1042 and possibly in part of the fine pore region 1030. The method 1000 may also include depositing a second electrode material 1080, wherein a second electrode material 1014 is deposited in the other coarse pore region 1040 adjacent to the dense electrolyte region, which, as already mentioned, is in part or all of the pores of the fine pore region 1030. The exemplary fuel cell 900 of FIG. 9 may have an asymmetric passive support having an electrolyte and two electrodes as described with reference to FIG. 10.

Figure 11:
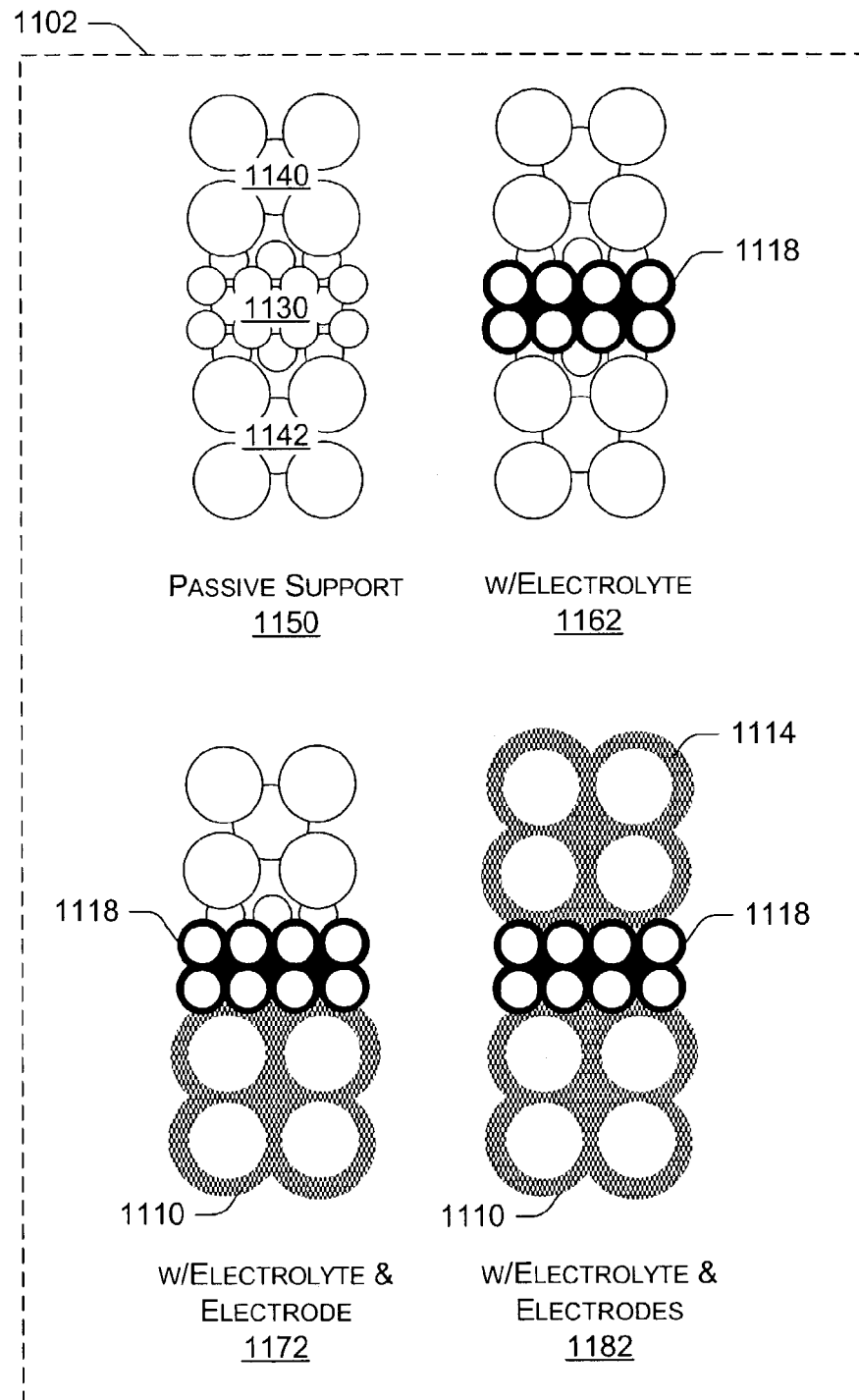
FIG. 11 shows another exemplary method and associated exemplary structures.

FIG. 11 shows an exemplary method 1102 and corresponding exemplary structures 1150, 1162, 1172, 1182. The method 1102 includes providing an asymmetric passive support 1150, wherein the passive support has a fine pore region 1130 bound between two coarser pore regions 1140, 1142. The exemplary method 1102 also includes depositing electrolyte material 1118, wherein electrolyte material 1118 is deposited in at least part of the fine pore region 1130 of the asymmetric passive support. A variety of techniques are suitable for limiting deposition to a part of the fine pore region 1130. For example, a material (e.g., electrode material, a removable material, etc.) is deposited into one of the coarse pore regions 1140, 1142 and optionally part of the fine pore region 1130 to limit deposition of electrolyte material. In another example, the fine pore region 1130 limits deposition of electrolyte material (e.g., due to pore size, etc.). The depositing 1162 creates a dense electrolyte region within part or all of the pores of the fine pore region 1130. The method 1102 further includes depositing a first electrode material 1172, wherein a first electrode material 1110 is deposited in one of the coarse pore regions 1142 and possibly in part of the fine pore region 1130. The exemplary method 1102 may also include depositing a second electrode material 1182, wherein a second electrode material 1114 is deposited into the other coarse pore region 1140 adjacent to the dense electrolyte region, which, as already mentioned, is in part or all of the pores of the fine pore region 1130. The exemplary fuel cell 900 of FIG. 9 may have an asymmetric passive support having an electrolyte and two electrodes as described with reference to FIG. 11.

Figure 12:
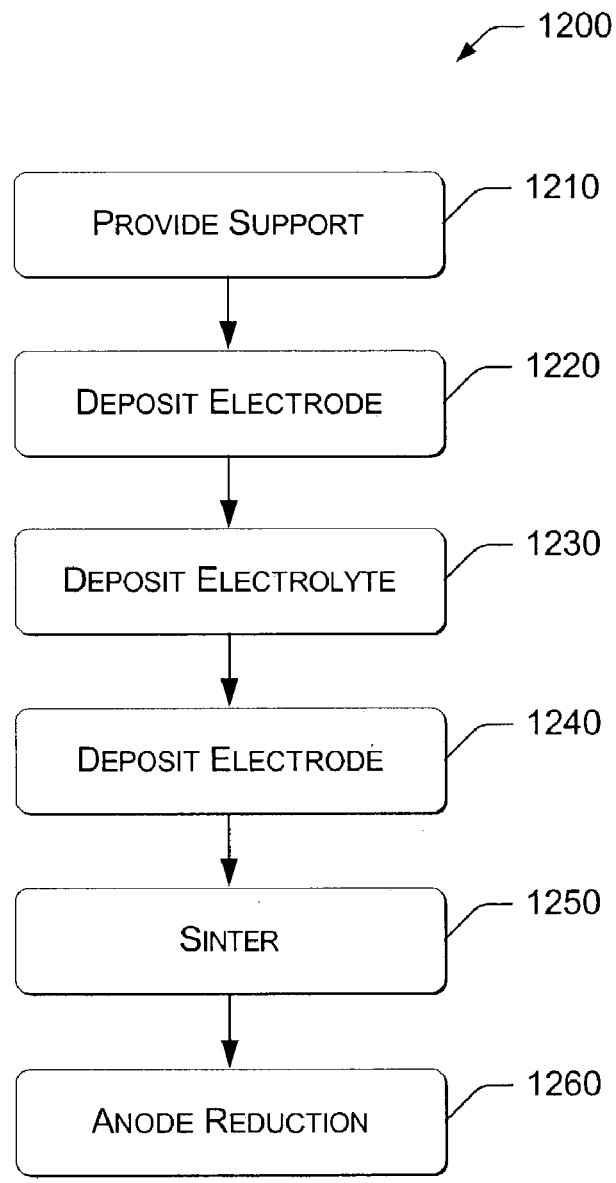
FIG. 12 shows a block diagram of an exemplary method for making a fuel cell based at least in part on a passive support.

FIG. 12 shows a block diagram of an exemplary method 1200 for making a fuel cell, such as, but not limited to, the fuel cell 900 of FIG. 9, which has an anode 910, a cathode 914 and an electrolyte 918 that is disposed between the anode 910 and the cathode 914. The method 1200 includes selection of a passive support 1210, for example, as discussed above. Once selected, the method 1200 continues with deposition of a material suitable for use as a first electrode into the pores of the passive support 1220. The deposition 1220 and optional other processes (which occur immediately thereafter or at some other time) form the first electrode. After deposition of the first electrode material, the method 1200 continues with deposition of a material suitable for use as an electrolyte into the pores of the passive support 1230. For example, the method 1200 may first deposit electrode material for an anode, deposit electrolyte material and then sinter the passive support and materials prior to deposition of a second electrode material for a cathode. In some instances, an anode material and an electrolyte material can withstand higher temperatures than a cathode material. Hence, in such instances, deposition of an anode material and deposition of an electrolyte material occurs prior to deposition of a cathode material. Of course, as described herein, various exemplary methods deposit an electrolyte material prior to deposition of one or more electrode materials.

In general, electrode or electrolyte material deposition may occur via any suitable deposition process, including physical and/or chemical deposition processes (e.g., ALD, CVD, EVD, ELD, etc.). After deposition of electrolyte material, the method 1200 continues with deposition of a second material suitable for use as a second electrode 1240. The electrode material deposition may occur via any suitable deposition process, including physical and/or chemical deposition processes (e.g., ALD, CVD, EVD, ELD, etc.). The deposition 1240 and optional other processes (which occur immediately thereafter or at some other time) form the second electrode. Sintering of the passive support and deposited materials 1250 optionally follows. For example, the sintering may employ a sintering temperature suitable for the anode material, the electrolyte material and the cathode material. Of course, as discussed above, prior sintering of the anode material and/or the electrolyte material may allow for subsequent sintering that employs a lower sintering temperature suited for sintering of the cathode material. In certain instances, such subsequent sintering at a lower sintering temperature may have little effect on the anode material and/or the electrolyte material.

Reduction of the anode 1260 is then optionally used to create additional porosity in the anode. Of course, other suitable methods may be used to make the exemplary fuel cell 900 of FIG. 9 and/or other fuel cells that use exemplary passive supports, electrodes and/or electrolytes disclosed herein.

Another exemplary method commences with deposition of an electrolyte material, for example, prior to deposition of any electrode material (see, e.g., the exemplary methods and/or structures 1000, 1102 described with reference to FIGS. 10 and 11). According to this exemplary method, deposition deposits the electrolyte material throughout the passive support wherein the thickness of the electrolyte material is typically approximately equal to a fine pore diameter of pores in a fine pore region (e.g., an average fine pore diameter). In this example, an electrolyte layer forms that has a typical thickness of approximately twice the fine pore diameter. Depending on characteristics of the passive support, for example, geometric uniformity of fine pores in a fine pore region, a dense electrolyte layer may be formed using a process such as ALD wherein the dense electrolyte layer has a thickness of approximately one-half the fine pore diameter. In general, a dense electrolyte layer having a thickness of less than approximately 3 μm may be formed and, in particular, a thickness of approximately 1 μm.

In another example, a passive support has one or more coarse pore regions that bound a fine pore region wherein one of the coarse pore regions has an average coarse pore diameter of approximately 1 μm to approximately 5 μm. After deposition of an electrode material in the coarse pore region and subsequent processing (e.g., sintering, etc.), an electrode forms having an average pore diameter of approximately 0.01 μm (or approximately 100 Å) to approximately 0.5 μm. According to various pore blocking theories, a blocking layer has a thickness of approximately three times the pore diameter; hence, where an electrolyte material is deposited on such an electrode, the resulting electrolyte layer or blocking layer may have a thickness of approximately 0.03 μm to approximately 1.5 μm.

Various exemplary methods may employ a deposition process that deposits an electrode material having a first particle size to block certain pores in a passive support and then deposits an electrode material having a second particle size wherein the second particle size is greater than the first particle size. In general, the electrode material is the same for both particle sizes. Of course, such a deposition process may be used for deposition of an electrolyte material.

Fuel Cells with Flow Channels

Figure 13:
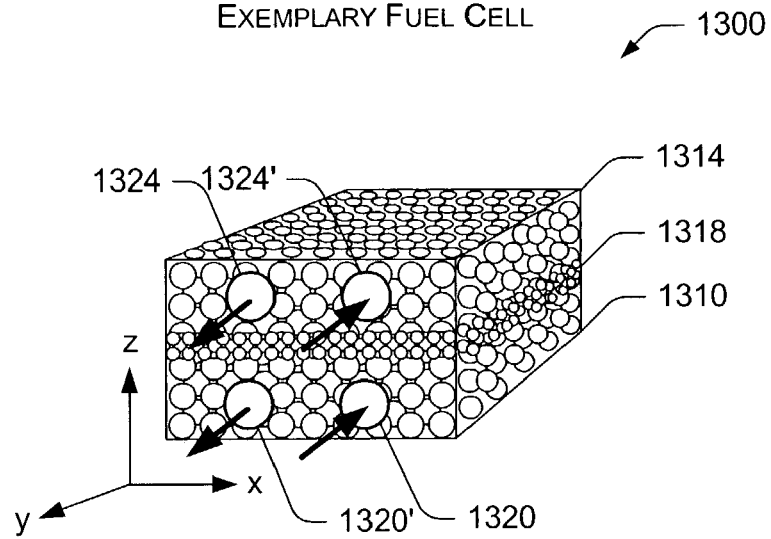
FIG. 13 shows a perspective view of an exemplary fuel cell and/or electrode and electrolyte configuration that includes one or more flow channels.

FIG. 13 shows an exemplary fuel cell 1300 that includes a first electrode 1310, a second electrode 1314, an electrolyte 1318, and one or more flow channels 1320, 1320' for the first electrode 1310 and one or more flow channels 1324, 1324' for the second electrode 1314. The fuel cell 1300 optionally includes any of the various exemplary electrodes and/or electrolytes discussed above. The flow channels 1320, 1320', 1324, 1324' may have any particular cross section and/or flow path within the first electrode 1310 or within the second electrode 1314. Flow may be in any appropriate direction. In general, the flow channels have dimensions that are larger than pores of the passive support or of an electrode. The first electrode flow channels 1320, 1320' or the second electrode flow channels 1324, 1324' may interconnect in a U-shaped manner or other manner and/or traverse the entire length (e.g., along the y-axis) of the fuel cell 1300. Alternatively, flow channels may enter from another first electrode surface (e.g., yz-plane, xy-plane, through the second electrode 1314 and electrolyte 1318, etc.) or from another second electrode surface (e.g., yz-plane, xy-plane, through the first electrode 1310 and electrolyte 1318, etc.) if the channels are appropriately sealed and/or insulated, etc.

Figure 14:
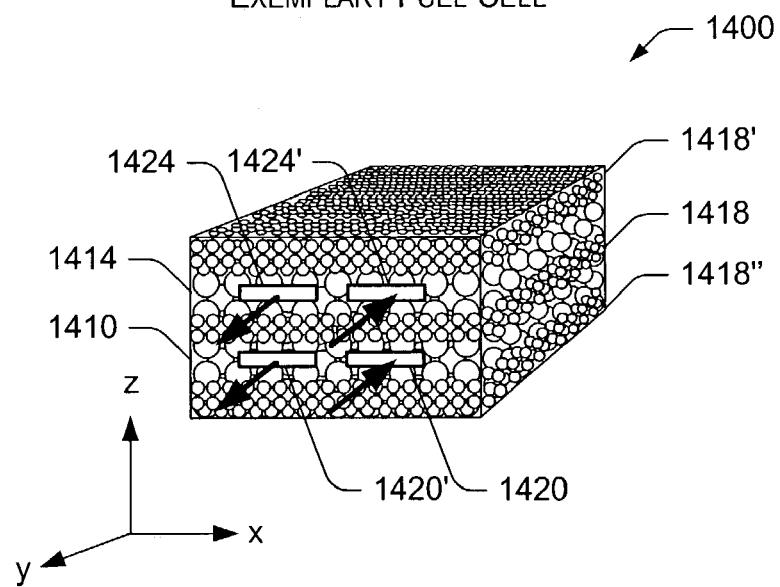
FIG. 14 shows a perspective view of an exemplary fuel cell and/or electrode and electrolyte configuration that includes one or more flow channels.

FIG. 14 shows an exemplary fuel cell 1400 that includes a first electrode 1410; a second electrode 1414; three electrolytes 1418, 1418', 1418"; and one or more flow channels 1420, 1420', 1424, 1424'. The fuel cell 1400 optionally includes any of the various exemplary electrodes and/or electrolytes discussed above. The flow channels 1420, 1420',

1424, 1424' may have any particular cross section and/or flow path within the first electrode 1410 and/or second electrode 1414. Flow may be in any appropriate direction. The first electrode flow channels 1420, 1420' or the second electrode flow channels 1424, 1424' may interconnect in a U-shaped manner or other manner and/or traverse the entire length (e.g., along the y-axis) of the fuel cell 1400. Alternatively, flow channels may enter from another first electrode surface (e.g., yz-plane, xy-plane, through the second electrode 1414 and one more of the electrolytes 1418, 1418', 1418", etc.) or from another second electrode surface (e.g., yz-plane, xy-plane, through the first electrode 1410 and one more of the electrolytes 1418, 1418', 1418", etc.) if the channels are appropriately sealed and/or insulated, etc.

Fuel Cell Frames and/or Electrode Frames

Figure 15:
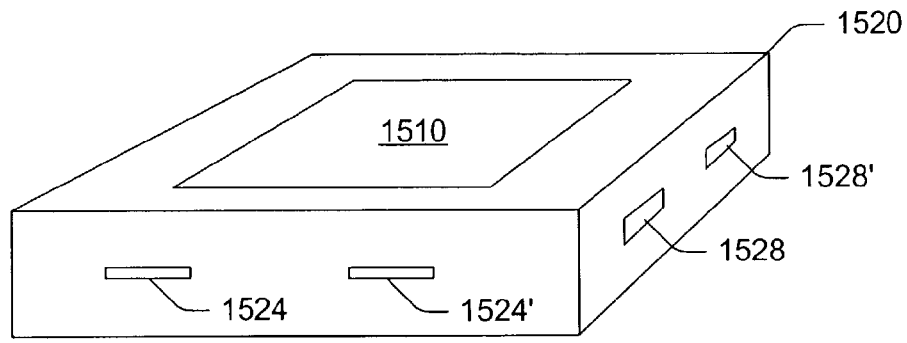
FIGS. 15 and 16 show perspective views of various exemplary fuel cell and frame configurations.

FIG. 15 shows an exemplary fuel cell or passive support 1510 and an exemplary frame 1520. The fuel cell or passive support 1510 is optionally integral with the frame 1520 or made separately and set into the frame 1520. As shown in FIG. 15, the fuel cell or passive support 1510 and the frame 1520 have substantially rectangular cross sections. In addition, the frame 1520 has one or more interconnects 1524, 1524', 1528, 1528' on any one or more of the frame surfaces. The interconnects 1524, 1524', 1528, 1528' may connect to one or more electrodes of a fuel cell. For example, the interconnect 1524 may connect to a cathode while the interconnect 1524' may connect to an anode. A series or an array of such frames are optionally constructed wherein the interconnects are used to electrically connect electrodes and/or fuel cells associated with the frames.

An exemplary frame is made of a dense material. For example, an exemplary frame is optionally made of a material suitable for use as a passive support yet having a density that is greater than that of the bulk passive support. Another exemplary frame is optionally made of a material that does not contiguous open pore (e.g., a material having predominately inaccessible voids or closed cells). An exemplary frame is optionally made of a material that has thermal expansion characteristics that approximate those of a passive support. In general, a frame forms a gas-tight contact with a passive support and does not allow electrical or gas contact between electrode chambers (e.g., anode and cathode chambers).

An exemplary integral passive support and frame are produced from a suitable and electrically nonconductive material (e.g., alumina, etc.). For example, a green body is formed having a passive support region and a frame region whereby sintering of the green body produces a porous passive support region and a dense frame region. The porous passive support region is optionally isometric and/or asymmetric with respect to pore characteristics. Of course, suitable interconnects may be positioned in the green body prior to sintering and/or added after sintering. Further, a gasket material is optionally added that separates the passive support region from the frame region. Such a gasket material is optionally an insulator, which can thereby allow for use of a conductive material to form a frame region.

Figure 16:
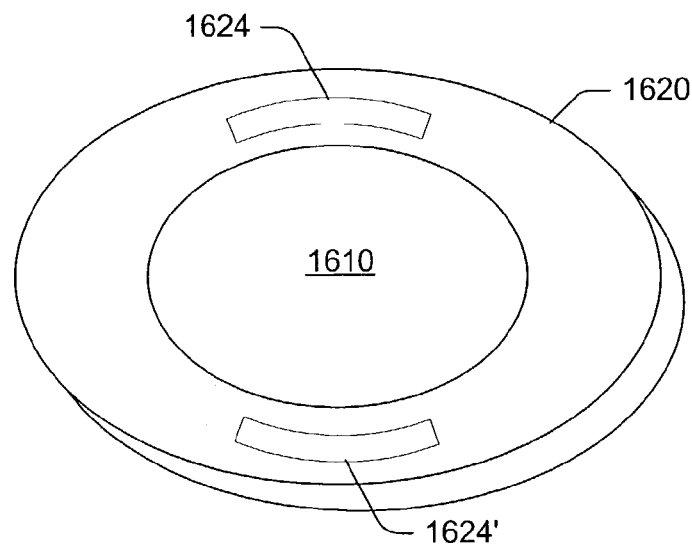

FIG. 16 shows another exemplary fuel cell or passive support 1610 and an exemplary frame 1620. The fuel cell or passive support 1610 is optionally integral with the frame 1620 or made separately and set into the frame 1620. As shown in FIG. 16, the fuel cell or passive support 1610 and the frame 1620 have a substantially circular cross section. In addition, the frame 1620 has one or more interconnects 1624, 1624' on any one or more of the frame surfaces.

Figure 17:
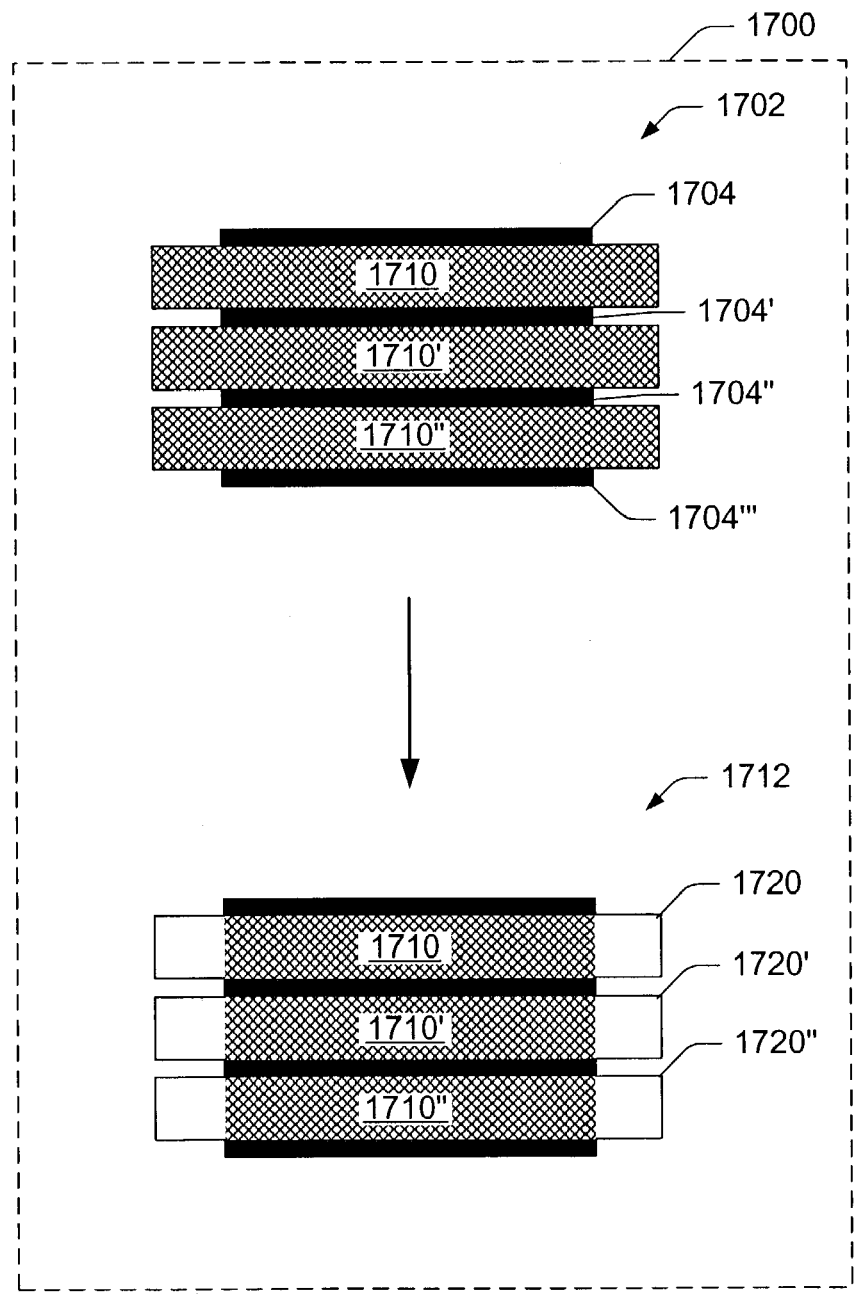
FIG. 17 shows an exemplary method and structures for an exemplary fuel cell and frame configuration.

Masking processes may be used to produce a passive support and a frame. FIG. 17 shows an exemplary method 1700 and structures 1702, 1712. The exemplary structure 1702 includes stacked passive supports 1710, 1710', 1710" with an upper mask 1704, interleaved masks 1704', 1704", and a lower mask 1704'". The exemplary method 1700 involves providing the structure 1702 and then depositing a material into at least part of each of the passive supports 1710, 1710', 1710". The depositing optionally includes low temperature chemical vapor deposition (CVD) wherein the masks are optionally composed of a relatively flexible material (e.g., TEFLON®, soft metals like Cu, Al, etc.). The masks prevent deposition of the material into at least part of each of the passive supports 1710, 1710', 1710" by masking some of the open porosity. In this example, the exposed or unmasked areas form frames 1720, 1720', 1720".

Figure 18A:
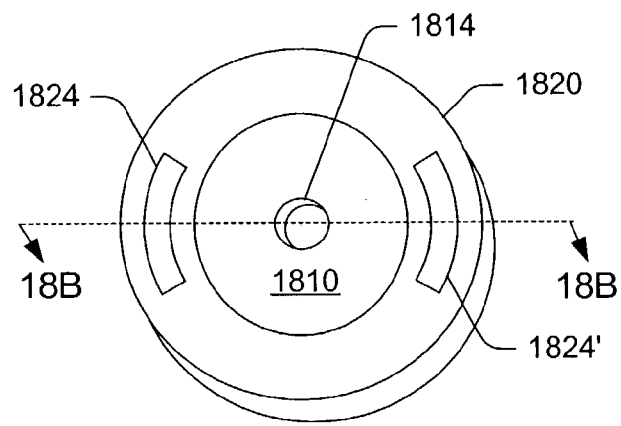
FIGS. 18A, 18B, 18C and 18D show a perspective view and various cross-sectional views, respectively, of an exemplary fuel cell and frame wherein the fuel cell defines an aperture. Various interconnect options are also shown.

FIG. 18A shows an exemplary fuel cell or passive support 1810 and an exemplary frame 1820. The frame 1820 include one or more interconnects 1824, 1824'. The fuel cell or electrode 1810 has an aperture 1814 that passes either partially or entirely through the fuel cell or passive support 1810. The aperture 1814 may serve any of a variety of purposes. For example, the aperture 1814 may facilitate mounting, allow for fuel and/or air flow, and/or stabilizing the fuel cell or passive support. The fuel cell or passive support 1810 optionally includes a fuel cell or an electrode described herein. Further, such a fuel cell or electrode optionally includes more than one aperture. Yet further, an exemplary frame may include one or more apertures that can serve similar or different purposes.

Figure 18B:
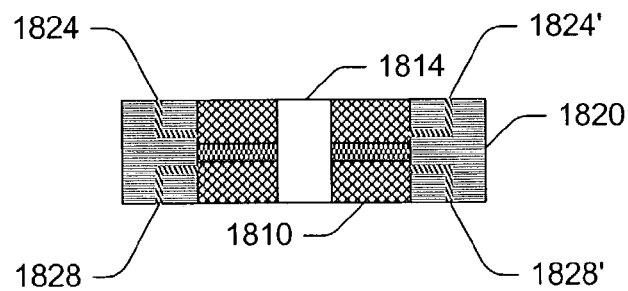

FIG. 18B shows a cross-sectional view of the exemplary fuel cell or passive support 1810 and an exemplary frame 1820 shown in FIG. 18A. In this example, the aperture 1814 traverses the entire height of the fuel cell or electrode 1810. The interconnects 1824, 1824' (e.g., first electrode interconnects) connect with a first electrode or first electrode region of the fuel cell or passive support 1810. Interconnects 1828, 1828' (e.g., second electrode interconnects) connect with a second electrode or second electrode region of the fuel cell or passive support 1810. In this example, the first interconnects 1824, 1824' and the second interconnects 1828, 1828' are separated by insulation (e.g., a non-conductive frame, etc.). In an exemplary method, passageways for such interconnects are optionally formed by positioning material in a green body whereby upon sintering, or other processing, the positioned material is degraded. Alternatively, interconnects are formed by positioning conductive interconnect material in a green body prior to sintering of the green body. Of course, other procedures for forming passageways and/or interconnects are possible, such as, imprinting, extrusion, etc.

Figure 18C:
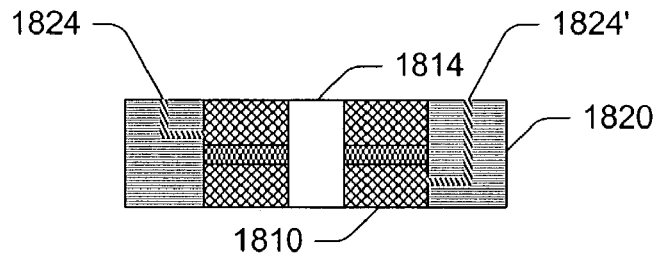

FIG. 18C shows another exemplary cross-section of an exemplary fuel cell or passive support 1810 and an exemplary frame 1820. In this example, the aperture 1814 traverses the entire height of the fuel cell or electrode 1810. A radial and axial interconnect 1824 (e.g., a first electrode interconnect) connects with a first electrode or first electrode region of the fuel cell or passive support 1810. Another radial and axial interconnect 1824' (e.g., a second electrode interconnect) connects with a second electrode or second electrode region of the fuel cell or passive support 1810. In this example, the first interconnect 1824 and the second interconnect 1824' are separated by insulation (e.g., a non-conductive frame, etc.). In an exemplary method, passageways for such interconnects are optionally formed by positioning material in a green body whereby upon sintering, or other processing, the positioned material is degraded. Alternatively, interconnects are formed by positioning conductive interconnect material in a green body prior to sintering of the green body. Of course, other procedures for forming passageways and/or interconnects are possible, such as, imprinting, extrusion, etc.

Figure 18D:
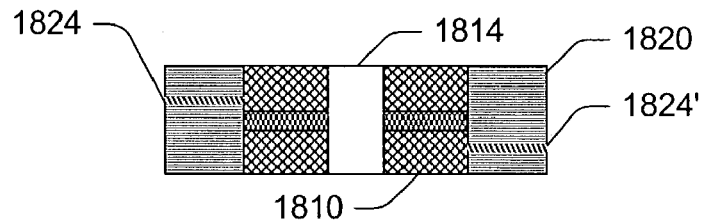

FIG. 18D shows yet another exemplary cross-section of an exemplary fuel cell or passive support 1810 and an exemplary frame 1820. In this example, the aperture 1814 traverses the entire height of the fuel cell or electrode 1810. A radial interconnect 1824 (e.g., a first electrode interconnect) connects with a first electrode or first electrode region of the fuel cell or passive support 1810. Another radial interconnect 1824' (e.g., a second electrode interconnect) connects with a second electrode or second electrode region of the fuel cell or passive support 1810. In this example, the first interconnect 1824 and the second interconnect 1824' are separated by insulation (e.g., a non-conductive frame, etc.). In an exemplary method, passageways for such interconnects are optionally formed by positioning material in a green body whereby upon sintering, or other processing, the positioned material is degraded. Alternatively, interconnects are formed by positioning conductive interconnect material in a green body prior to sintering of the green body. Of course, other procedures for forming passageways and/or interconnects are possible, such as, imprinting, extrusion, etc.

As mentioned, the aperture 1814 may allow for fuel and/or air flow or exhaust. Further, an aperture may connect to one or more additional flow channels. In an exemplary method, flow channels are optionally formed by positioning material in a green body whereby upon sintering, or other processing, the positioned material is degraded.

Figure 19:
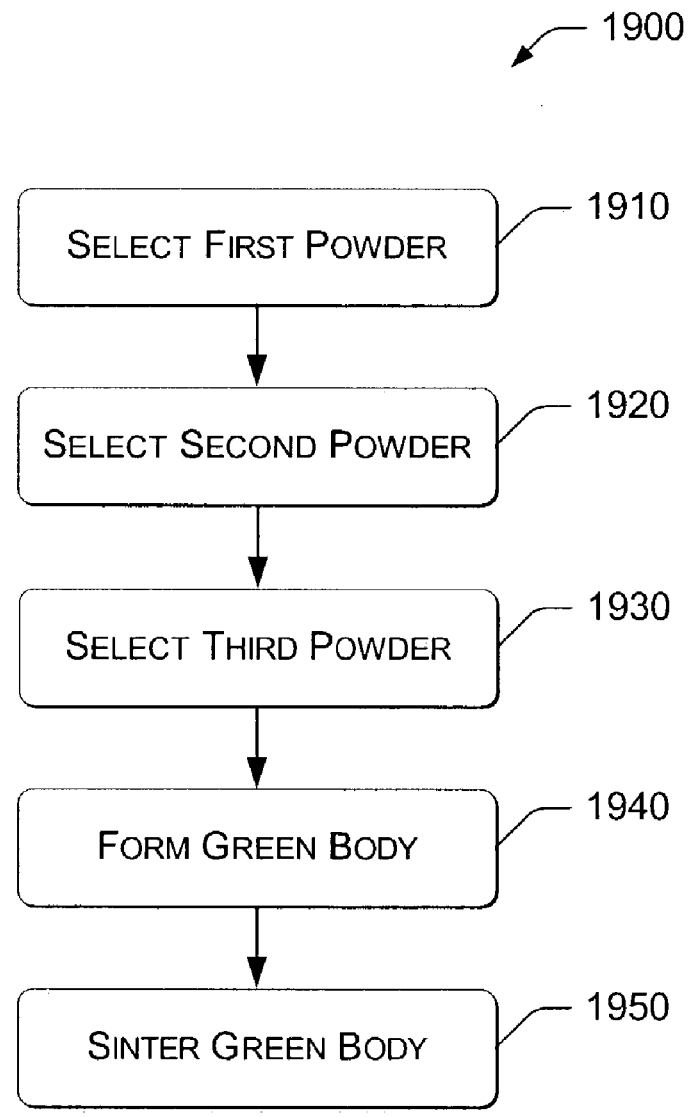
FIG. 19 shows a block diagram of an exemplary method for making a passive support and frame.

FIG. 19 shows an exemplary method 1900 for making a passive support and a frame. The method 1900 includes selection of a first powder 1910 (e.g., for fine porosity), selection of a second powder 1920 (e.g., for coarser porosity) and selection of a third powder 1930 (e.g., for a dense frame region). Of course, a fourth powder may be selected to create a passive support with coarse power regions that have different characteristics yet wherein the coarse pore regions still bound a fine pore region. The first, second and third powders optionally include additives such as polymers that may act as binders and/or lubricants (e.g., polyvinyl alcohol, etc.). The method 1900 continues with formation of a green body 1940. Green body formation includes formation of a passive support green body region and a frame green body region. Green body formation may include use of a mold for molding, an extruder for extruding, a pressure filter for pressure filtering, and/or other device to help form a suitable green body shape having appropriate properties (e.g., density, etc.). Further, gasket material is optionally positioned at any boundary between the passive support green body region and the frame green body region. The gasket material is optionally an insulator that can insult an electrode or fuel cell from a frame. Yet further, the passive support green body region or the frame green body region may have one or more materials positioned therein to form one or more passageways, interconnects and/or flow channels. After formation of the green body 1940, the method 1900 continues with sintering of the green body 1950 to form a passive support and frame.

What is claimed is:
1. A solid oxide fuel cell comprising:
 a passive support having pores wherein the passive support has a fine pore region disposed between a first coarser pore region and a second coarser pore region;
 an electrolyte material positioned in the fine pore region;
 a first electrode material positioned in the first coarser pore region; and
 a second electrode material positioned in the second coarser pore region.

2. The fuel cell of claim 1, wherein the first electrode material comprises a metal and/or metal oxide.

3. The fuel cell of claim 1, wherein the first electrode material comprises a reduced metal oxide having secondary porosity.

4. The fuel cell of claim 3, wherein the metal oxide comprises nickel oxide.

5. The fuel cell of claim 1, wherein the first coarser pore region has an asymmetric pore morphology.

6. The fuel cell of claim 5, wherein the asymmetric pore morphology limits mobility of the first electrode material asymmetrically.

7. The fuel cell of claim 5, wherein the pore morphology of the first coarser pore region is selected to limit mobility of the first electrode material.

8. The fuel cell of claim 1, wherein pore morphology of the second coarser pore region is selected to limit thermal expansion.

9. The fuel cell of claim 8, wherein the pore morphology limits thermal expansion of the second coarser pore region asymmetrically.

10. The fuel cell of claim 1, wherein pore morphology of any of the pore regions is selected to limit mobility and to limit thermal expansion of any of the materials in the passive support.

11. The fuel cell of claim 1, further comprising one or more flow channels.

12. The fuel cell of claim 1, further comprising an aperture.

13. The fuel cell of claim 1, further comprising a frame.

14. The fuel cell of claim 1, comprising a solid oxide fuel cell anode.

15. The fuel cell of claim 1, comprising a solid oxide fuel cell cathode.

16. The fuel cell of claim 15, further comprising one or more interconnects.

17. A method comprising:
 depositing an electrolyte material in a porous asymmetric passive support to block at least some pores of the porous asymmetric passive support;
 depositing an electrode material in the porous asymmetric passive support such that at least some of the electrode material contacts the electrolyte material; and
 sintering the porous asymmetric passive support, the electrolyte material and the electrode material to produce a dense electrolyte layer and a porous electrode.

18. The method of claim 17, further comprising reducing the electrode material to further increase porosity of the porous electrode.

19. The method of claim 18, wherein the electrode material comprises a metal oxide.

20. The method of claim 17, further comprising depositing a second electrode material in the porous asymmetric passive support.

21. The method of claim 20, further comprising a second sintering for sintering the second electrode material in the porous asymmetric passive support wherein the second sintering uses a temperature less than that of the first sintering.

22. The method of claim 17, wherein the dense electrolyte layer has a thickness of less than approximately 3 μm.

23. A method comprising:
  conducting ions through an electrolyte positioned in a fine pore region of a passive support wherein the fine pore region is disposed between two coarser pore regions of the passive support; and
  sintering or reducing the electrode material to increase porosity of the electrode material; and
  reacting the conducted ions with a fuel to thereby generate an electrical potential.

24. The method of claim 23, further comprising providing the fuel via an electrode that comprises an electrode material positioned in one of the coarser pore regions of the passive support.

25. A method of constructing a fuel cell comprising:
  determining an acceptable range of thermal expansion of a cathode and an electrolyte;
  determining an acceptable range of agglomeration of an electrode material in an anode;
  selecting a porous passive support based at least in part on the acceptable range of thermal expansion and the acceptable range of agglomeration; and
  constructing a fuel cell using the selected porous passive support, the cathode, the electrolyte and the electrode material as an anode.

26. The method of claim 25, wherein the selecting includes selecting one or more pore sizes.

27. The method of claim 25, wherein the selecting includes selecting an asymmetric pore morphology.

28. The method of claim 25, wherein the acceptable range of agglomeration depends at least in part on an agglomeration rate.

29. A method of making a frame and a passive support for a fuel cell comprising:
  selecting a first powder for a fine pore region of the passive support;
  selecting a second powder for a coarser pore region of the passive support;
  selecting a third powder for a frame;
  forming a green body having a passive support green body region and a frame green body region; and
  sintering the green body to produce the frame and the passive support for a fuel cell.

30. The method of claim 29, wherein the forming includes molding, extruding, and/or pressure filtering.

31. The method of claim 29, further comprising positioning gasket material at a boundary between the passive support green body region and the frame green body region.

32. The method of claim 29, further comprising positioning a material in the green body to form one or more passageways, interconnects and/or flow channels.

33. The method of claim 32, wherein the sintering degrades the material.

34. An electrode comprising:
  a metal oxide-based passive support having pores wherein the passive support has a fine pore region disposed between two coarser pore regions; and
  an electrode material positioned in at least one of the coarser pore regions.

35. A fuel cell comprising:
  means for conducting ions through an electrolyte positioned in a fine pore region of a metal oxide-based passive support wherein the fine pore region is disposed between two coarser pore regions of the passive support; and means for reacting the conducted ions with a fuel to thereby generate an electrical potential.

36. A fuel cell comprising:
  a metal oxide-based passive support having pores wherein the passive support has a fine pore region disposed between a first coarser pore region and a second coarser pore region;
  an electrolyte material positioned in the fine pore region;
  a first electrode material positioned in the first coarser pore region; and
  a second electrode material positioned in the second coarser pore region.

37. A method comprising:
  conducting ions through an electrolyte positioned in a fine pore region of a metal oxide-based passive support wherein the fine pore region is disposed between two coarser pore regions of the passive support; and
  reating the conducted ions with a fuel to thereby generate an electrical potential.

* * * * *